(12) United States Patent (10) Patent No.: US 12,636,928 B2

Gonzalez Chapa et al. (45) Date of Patent: May 26, 2026

(54) CART STABILIZATION SYSTEM, ROLLING CART ELEMENTS AND METHODS OF USING SAME

(71) Applicant: Monogram Technologies Inc., Austin, TX (US)

(72) Inventors: Gerardo Angel Gonzalez Chapa, Austin, TX (US); Scott Hudson, Pflugerville, TX (US)

(73) Assignee: Zimmer, Inc., Warsaw, IN (US)

( * ) Notice: Subject to any disclaimer, the term of this patent is extended or adjusted under 35 U.S.C. 154(b) by 0 days.

(21) Appl. No.: 18/776,799

(22) Filed: Jul. 18, 2024

(65) Prior Publication Data

US 2024/0367474 A1 Nov. 7, 2024

Related U.S. Application Data

(63) Continuation of application No. PCT/US2023/061141, filed on Jan. 24, 2023.

(Continued)

(51) Int. Cl.
*B60G 17/033* (2006.01)
*B60B 33/00* (2006.01)
(Continued)

(52) U.S. Cl.
CPC ........ *B60G 17/033* (2013.01); *B60B 33/0005* (2013.01); *B60B 33/0042* (2013.01);
(Continued)

(58) Field of Classification Search
CPC ............ B60B 33/0005; B60B 33/0049; B60B 33/0042; B60B 33/0068; B60B 33/0057;
(Continued)

(56) References Cited

U.S. PATENT DOCUMENTS 1,133,798 A * 3/1915 Hall ........................ B60B 33/06
15/264
2,262,288 A * 11/1941 Klipstein .............. D06F 39/125
188/162

(Continued)

FOREIGN PATENT DOCUMENTS

CA 3249072 A1 7/2023
CN 109820599 A 5/2019
(Continued)

OTHER PUBLICATIONS

Jang, Supporting Truckle and Mobile Medical Equipment, Sep. 1, 2020, EPO, CN 111605365 A, Machine Translation of Description (Year: 2020).*

(Continued)

*Primary Examiner* — Paul N Dickson
*Assistant Examiner* — Matthew D Lee
(74) *Attorney, Agent, or Firm* — SCHWEGMAN LUNDBERG & WOESSNER, P.A.

(57) ABSTRACT

A cart stabilization system and rolling cart elements for robotic surgery and other medical instrumentation are disclosed. The cart stabilization system includes a base and lifting caster systems coupled to a bottom portion of the base. Each lifting caster system includes a rolling element, a swivel foot assembly moveably coupled to the rolling element; and a hydraulic mounting base coupled to a portion of the swivel foot assembly. Methods of assembling a lifting caster system and for using a cart stabilization system are also disclosed.

28 Claims, 29 Drawing Sheets

Related U.S. Application Data

(60) Provisional application No. 63/302,414, filed on Jan. 24, 2022.

(51) Int. Cl.

| | |
|---|---|
| *B60B 33/04* | (2006.01) |
| *B60B 33/06* | (2006.01) |
| *B60G 17/056* | (2006.01) |
| *B25J 5/00* | (2006.01) |

(52) U.S. Cl.
CPC ...... *B60B 33/0049* (2013.01); *B60B 33/0057* (2013.01); *B60B 33/0068* (2013.01); *B60B 33/0073* (2013.01); *B60B 33/0086* (2013.01); *B60B 33/045* (2013.01); *B60B 33/063* (2013.01); *B60G 17/056* (2013.01); *B25J 5/007* (2013.01); *B60B 2320/10* (2013.01); *B60B 2900/551* (2013.01); *B60G 2202/413* (2013.01); *B60G 2202/416* (2013.01); *B60G 2300/26* (2013.01)

(58) Field of Classification Search
CPC .............. B60B 33/0073; B60B 33/045; B60B 33/0086; B60B 33/063; B60B 33/0018; B60B 33/0039; B60B 33/006; B60B 33/021; B60B 33/06; B60B 33/04; B60B 33/0078; B60B 33/0089; B60B 2200/26; B60B 33/0097; B25J 5/007; B60G 2202/413; B60G 2202/416; B62B 3/1404; A61G 7/0528
See application file for complete search history.

(56) References Cited

U.S. PATENT DOCUMENTS

| | | | | |
|---|---|---|---|---|
| 4,497,501 A * | 2/1985 | Kedem | ................ | B62B 3/0618 |
| | | | | 280/43.12 |
| 5,259,088 A * | 11/1993 | Yang | .................. | B60B 33/0089 |
| | | | | 16/33 |
| 6,055,704 A * | 5/2000 | Leibman | ............. | B60B 33/0063 |
| | | | | 16/35 R |
| 6,637,071 B2 * | 10/2003 | Sorensen | ................ | B60B 33/04 |
| | | | | 16/33 |
| 7,478,819 B1 * | 1/2009 | Boraas | ................ | B60B 33/0039 |
| | | | | 16/30 |
| 10,875,358 B1 | 12/2020 | Santini | | |
| 2003/0153258 A1 * | 8/2003 | Hendrix | .................. | A22B 5/06 |
| | | | | 452/187 |
| 2006/0010643 A1 * | 1/2006 | Hornbach | ........... | B60B 33/0018 |
| | | | | 16/19 |

| | | | | |
|---|---|---|---|---|
| 2007/0277350 A1 * | 12/2007 | Hines | ..................... | B60B 33/04 |
| | | | | 16/35 R |
| 2008/0229545 A1 * | 9/2008 | Duvert | .................. | B60B 33/045 |
| | | | | 5/310 |
| 2011/0289729 A1 * | 12/2011 | Tsai | .................... | B60B 33/0086 |
| | | | | 16/35 R |
| 2014/0238784 A1 * | 8/2014 | Yeo | ........................ | B60B 33/021 |
| | | | | 188/1.12 |
| 2015/0096846 A1 * | 4/2015 | Lin | ..................... | B60B 33/0086 |
| | | | | 188/1.12 |
| 2016/0052339 A1 * | 2/2016 | Dayt | .................. | B60B 33/0073 |
| | | | | 16/47 |
| 2017/0065354 A1 | 3/2017 | Shiels et al. | | |
| 2017/0101118 A1 * | 4/2017 | Johnson | .................. | B62B 3/10 |
| 2018/0319023 A1 | 11/2018 | Robinson et al. | | |
| 2018/0346008 A1 * | 12/2018 | Nahum | .................. | B62B 5/049 |
| 2019/0226504 A1 * | 7/2019 | Richter | .................. | F15B 11/10 |

FOREIGN PATENT DOCUMENTS

| | | | | | | |
|---|---|---|---|---|---|---|
| CN | 111605365 A | * | 9/2020 | ........... | B60B 33/063 |
| CN | 114795500 A | * | 7/2022 | ............. | A61B 34/30 |
| CN | 118810288 A | * | 10/2024 | ............. | F16F 15/67 |
| DE | 4321739 A1 | * | 1/1995 | ........... | A61G 7/0528 |
| DE | 202016103086 U1 | * | 8/2016 | ......... | B60B 33/0089 |
| EP | 3903719 A1 | | 11/2021 | | |
| EP | 4469214 A1 | | 12/2024 | | |
| GB | 2535173 A | * | 8/2016 | ........... | F15B 15/066 |
| JP | 3129344 U | * | 2/2007 | | |
| JP | 2025504512 A | | 2/2025 | | |
| KR | 101883620 B1 | | 7/2018 | | |
| KR | 102276564 B1 | | 7/2021 | | |
| KR | 20240164497 A | | 11/2024 | | |
| WO | WO-2005120865 A1 | * | 12/2005 | ......... | B60B 33/0007 |
| WO | 2023141647 A1 | | 7/2023 | | |

OTHER PUBLICATIONS

"European Application Serial No. 23744011.0, Extended European Search Report mailed Dec. 5, 2025", 13 pgs.

"European Application Serial No. 23744011.0, Response to Communication pursuant to Rules 161(2) and 162 EPC filed Mar. 3, 2025", 16 pgs.

"International Application Serial No. PCT/US2023/061141, International Preliminary Report on Patentability mailed Aug. 8, 2024", 12 pgs.

Gonzalez Chapa et al., International Search Report and Written Opinion of the International Searching Authority for PCT/US2023/061141 (published as WO 2023141647), 13 Pages, dated Apr. 6, 2023.

* cited by examiner

100

102

120

110

104

104

104

104

104

262
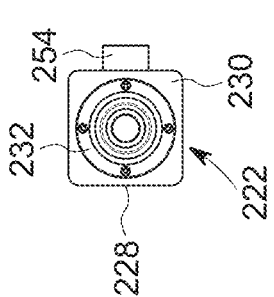
232
254
228
230
222
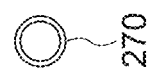
270
280
FIG. 28
302
306
323
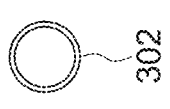
310
220
323
262
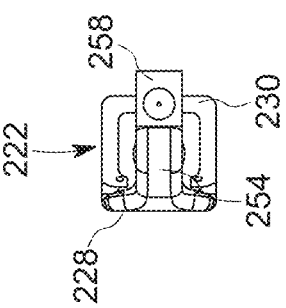
258
222
228
254
230
270
280
FIG. 29
302
306
323
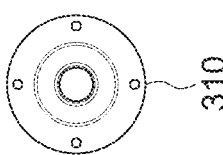
310
220
323

340

390

364

306

342

340

390

364

306

342

340

340

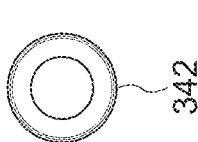
342
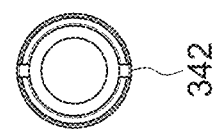
342
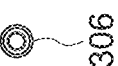
306
306
FIG. 36
FIG. 37
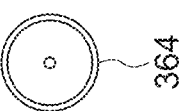
364
364
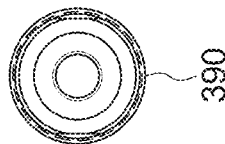
390
340
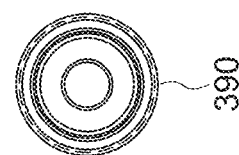
390
340

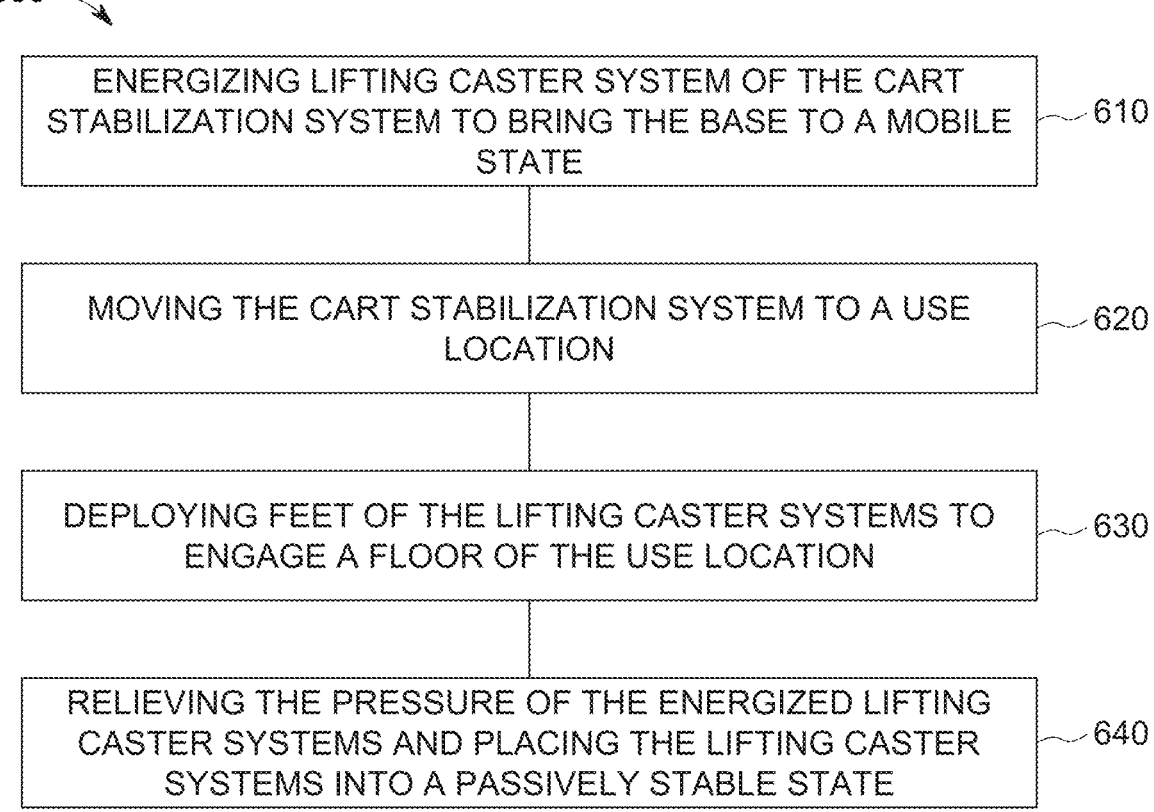

600

ENERGIZING LIFTING CASTER SYSTEM OF THE CART STABILIZATION SYSTEM TO BRING THE BASE TO A MOBILE STATE — 610

MOVING THE CART STABILIZATION SYSTEM TO A USE LOCATION — 620

DEPLOYING FEET OF THE LIFTING CASTER SYSTEMS TO ENGAGE A FLOOR OF THE USE LOCATION — 630

RELIEVING THE PRESSURE OF THE ENERGIZED LIFTING CASTER SYSTEMS AND PLACING THE LIFTING CASTER SYSTEMS INTO A PASSIVELY STABLE STATE — 640

FIG. 42

CART STABILIZATION SYSTEM, ROLLING CART ELEMENTS AND METHODS OF USING SAME

CROSS-REFERENCE TO RELATED APPLICATION

This application is a bypass continuation of International Application No. PCT/US2023/061141, filed on Jan. 24, 2023, entitled "Cart Stabilization System, Rolling Cart Elements And Methods Of Using Same", which international application perfects and claims priority benefit of U.S. Provisional Application No. U.S. Provisional Patent Application No. 63/302,414, filed Jan. 24, 2022, entitled "Cart Stabilization System, Rolling Cart Elements And Methods Of Using Same," which applications are hereby incorporated herein by reference in their entireties.

TECHNICAL FIELD

The present disclosure relates generally to a cart stabilization system and rolling cart elements. More specifically, but not exclusively, the present disclosure concerns a cart stabilization system and rolling cart elements for transporting and stabilizing robots and methods of using the cart stabilization system and rolling cart elements.

BACKGROUND

Currently, robot stabilization carts use stabilizing rolling cart elements or casters that must be energized or actuated to provide stability. The currently available systems use electric, hydraulic, or mechanical input to actuate the stabilization system. In the passive state, the systems allow for free motion of the casters. The current stabilization carts extend or deploy feet that provide a stable path from the base to the floor in their active state. However, a loss of energy during use couple compromise the stability of the cart and the robot operations. For example, if the stabilization cart was used during robotic surgery and the stability was compromised during the surgical procedure it could have catastrophic results for the patient. In some existing systems the casters are actuated, while in other existing systems the stabilizing feet are activated. Those that include actuation of the casters can result in compromised mobility or deployment time. For example, by extending the casters enough for the foot to clear obstacles, longer retraction times would be needed in order to bring the feet in contact with the floor. Alternatively, if the feet are kept close to the floor in a mobile state, then the type and size of obstacles the system can overcome is negatively impacted. In addition, once energy is lost during use, additional energy must be added to the system to bring it to a stable state, which takes time and could result in delayed use of the robot. Therefore, in order to avoid loss of time and money, as well as potential catastrophic events, during robot use due to energy loss, a cart stabilization system and rolling cart elements that are stable during robot operations are needed.

SUMMARY

Aspects of the present disclosure provide a cart stabilization system and rolling cart elements, as well as methods of using the same.

In one aspect, provided herein is a cart stabilization system, including a base and lifting caster systems coupled to a bottom surface of the base.

In another aspect, provided herein is a lifting caster system including a rolling element, a swivel foot assembly moveably coupled to the rolling element, and a hydraulic mounting base coupled to a portion of the swivel foot assembly.

In another aspect, provided herein is a cart stabilization system having a base, a plurality of lifting systems coupled to a bottom portion of the base, and an energizable system operably connected to the rolling element and to the foot. Each of the plurality of lifting systems includes a rolling element, a foot, and the at least one rolling element being separately movable relative to the foot. The energizable system is disposable in an energized state with the plurality of lifting systems energized to engage the rolling elements with the support structure allowing the cart stabilization system to be movable relative to the support structure. The energizable system is disposable in a deenergized state with the plurality of lifting systems denergized to engage the feet with the support structure allowing the cart stabilization system to be nonmovable relative to the support structure.

In yet another aspect, provided herein is a method of assembling a lifting caster system including obtaining a caster with wheels and brakes coupled to a base member. The method also includes positioning a spring between a top surface of the base member and a foot base and inserting a fastener through a through hole in the base member and into a swivel housing of the foot base. The method further includes inserting a second end of a lifting shaft into the swivel housing and sliding a foot mount over the lifting shaft to position a portion of the lifting shaft within a swivel member in the foot mount. In addition, the method includes positioning a cap on a shaft of a piston and positioning a cylinder body over the piston. Finally, the method includes engaging the cap with an interior groove of the cylinder body.

In still another aspect, provided herein is a method of using a cart stabilization system, including energizing lifting caster systems of the cart stabilization system to bring the base to a mobile state. The method also includes moving the cart stabilization system to a use location. In addition, the method includes deploying feet of the lifting caster systems to engage a floor of the use location. The method further includes relieving the pressure of the energized lifting caster systems and placing the lifting caster systems into a passively stable state.

These, and other objects, features and advantages of this present disclosure will become apparent from the following detailed description of the various aspects of the present disclosure taken in conjunction with the accompanying drawings.

BRIEF DESCRIPTION OF DRAWINGS

The accompanying drawings, which are incorporated in and constitute a part of the specification, illustrate embodiments of the present disclosure and together with the detailed description herein, serve to explain the principles of the present disclosure. The drawings are only for purposes of illustrating preferred embodiments and are not to be construed as limiting the present disclosure. It is emphasized that, in accordance with the standard practice in the industry, various features are not drawn to scale. In fact, the dimensions of the various features may be arbitrarily increased or reduced for clarity of discussion. The foregoing and other objects, features and advantages of the present disclosure are apparent from the following detailed description taken in conjunction with the accompanying drawings in which:

FIG. 28 is an exploded, top view of the intermediate portion of FIG. 22, in accordance with an aspect of the present disclosure;

FIG. 29 is an exploded, bottom view of the intermediate portion of FIG. 22, in accordance with an aspect of the present disclosure;

FIG. 36 is an exploded, top view of the second end portion of FIG. 30, in accordance with an aspect of the present disclosure;

FIG. 37 is an exploded, bottom view of the second end portion of FIG. 30, in accordance with an aspect of the present disclosure;

FIG. 42 is a flow chart of a process for using a cart stabilization system.

DETAILED DESCRIPTION

Figure 1:
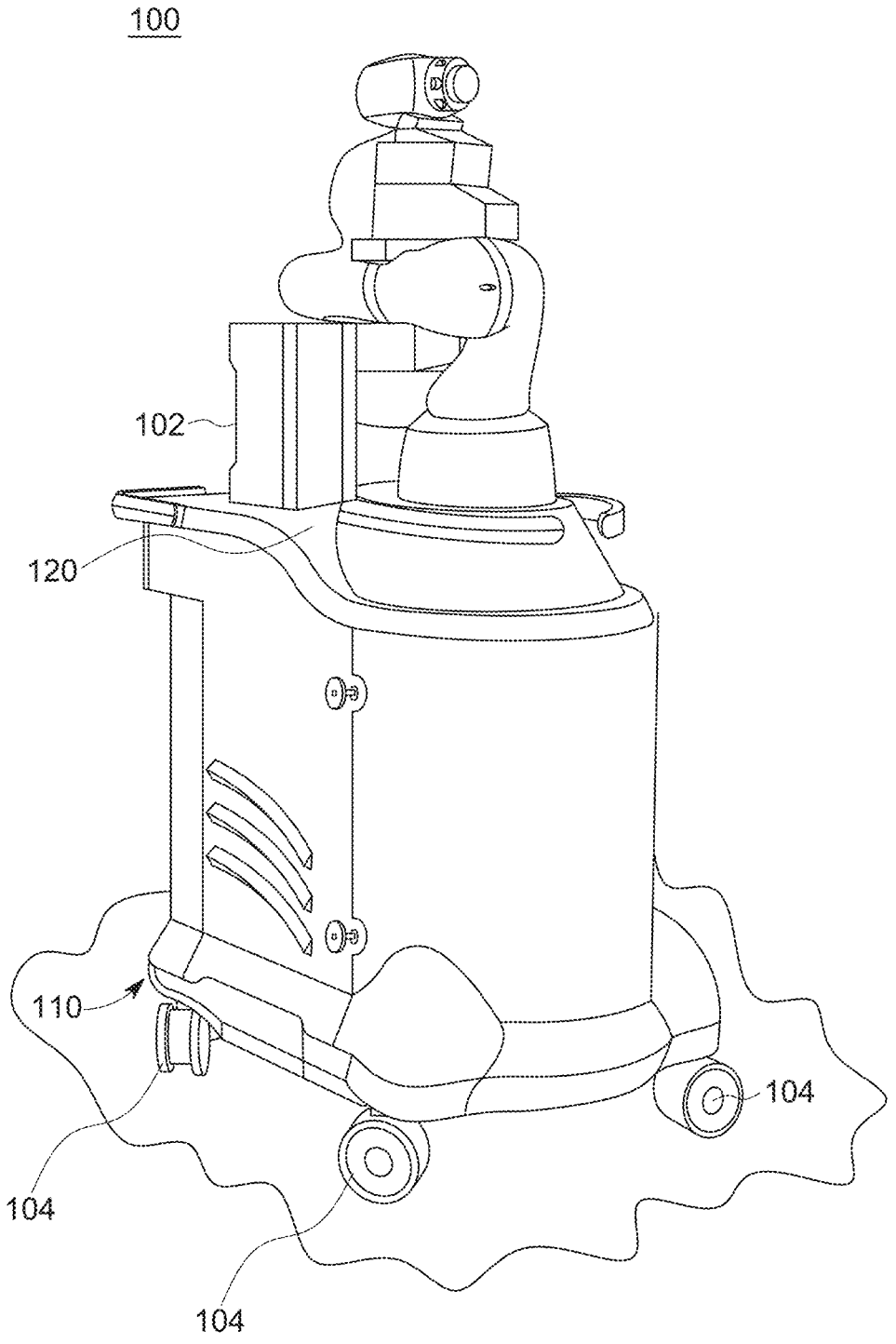
FIG. 1 is a perspective view of a cart stabilization system including a plurality of lifting caster systems, in accordance with an aspect of the present disclosure.
Figure 3:
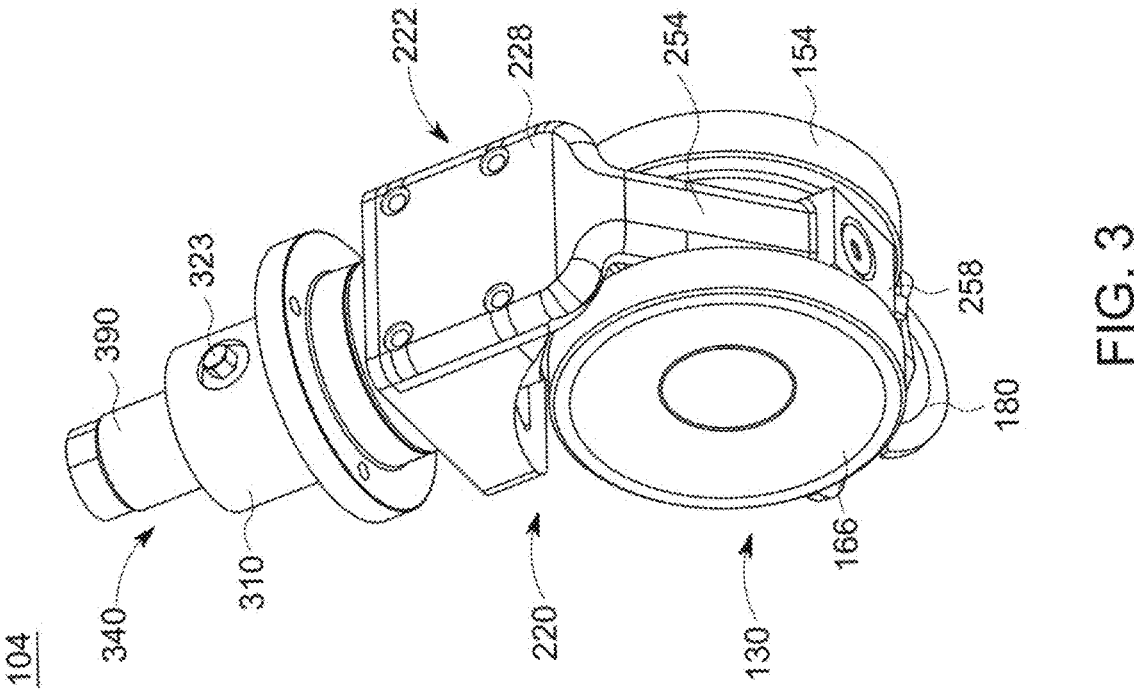
FIG. 3 is a second perspective view of the lifting caster system of FIG. 2, in accordance with an aspect of the present disclosure.
Figure 2:
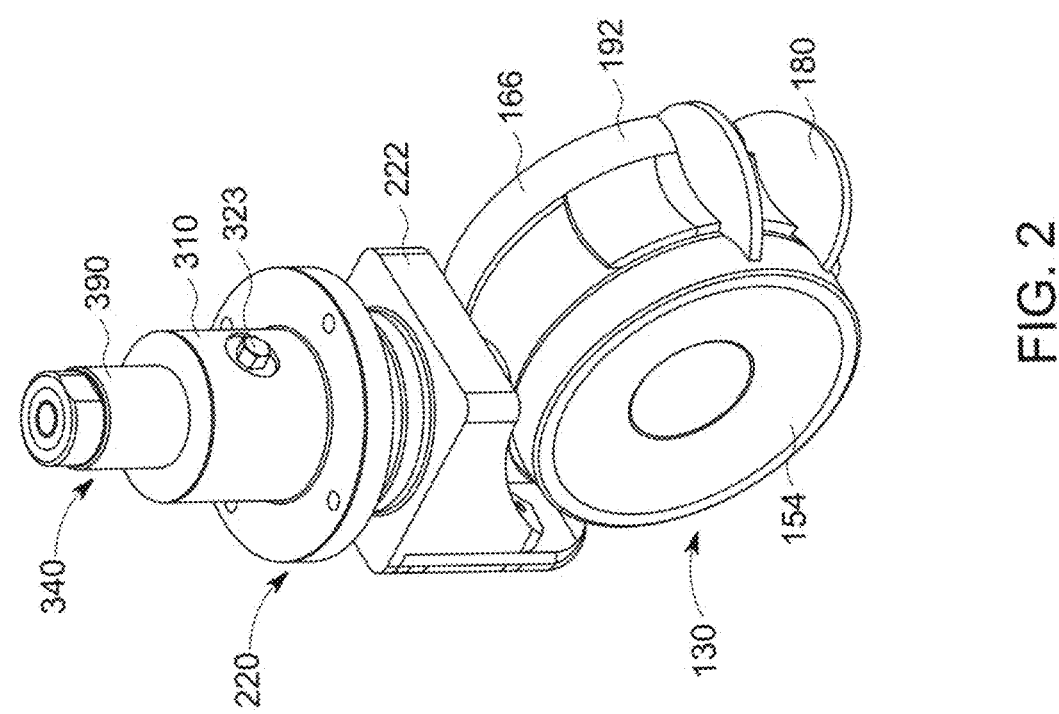
FIG. 2 is a first perspective view of one of the lifting caster systems of FIG. 1, in accordance with an aspect of the present disclosure.
Figure 5:
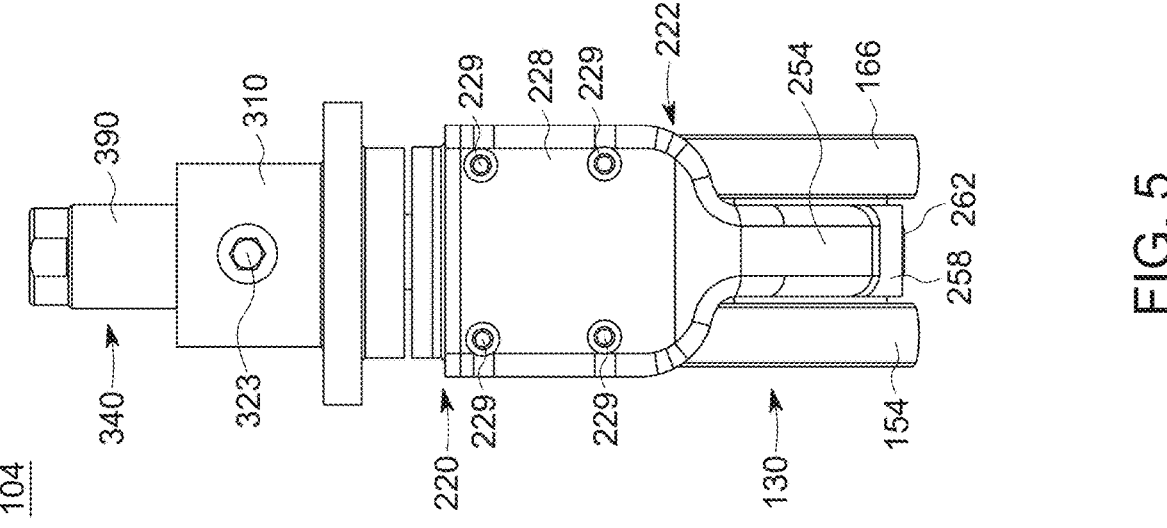
FIG. 5 is a second end view of the lifting caster system of FIG. 2, in accordance with an aspect of the present disclosure.
Figure 4:
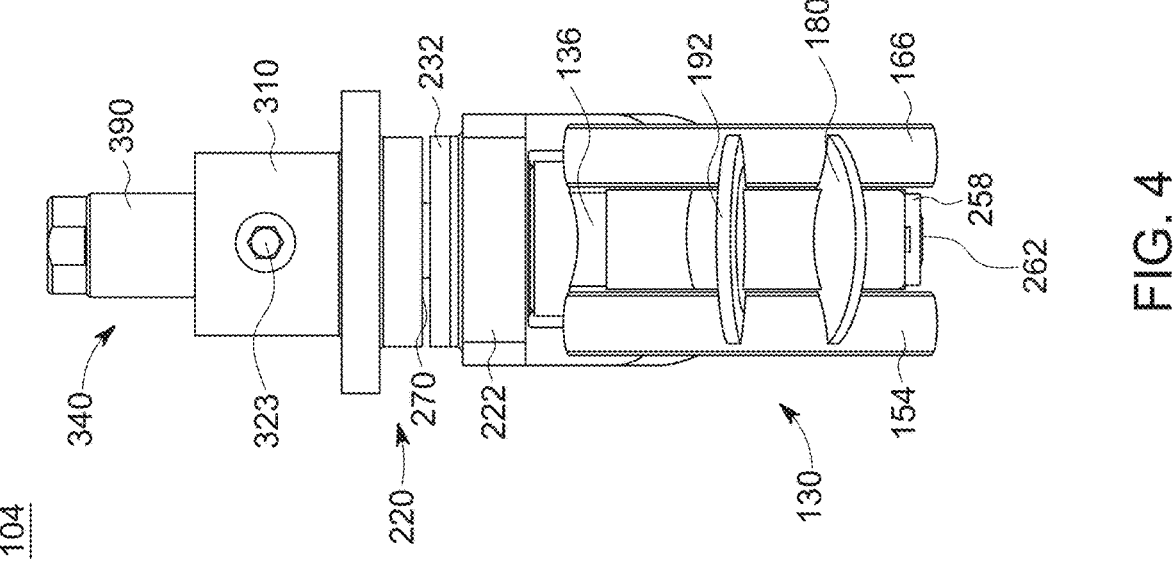
FIG. 4 is a first end view of the lifting caster system of FIG. 2, in accordance with an aspect of the present disclosure.

Generally stated, disclosed herein are embodiments of a cart stabilization system and rolling cart elements. Further, methods for using the cart stabilization system and rolling cart elements are also disclosed.

In this detailed description and the following claims, the words proximal, distal, anterior, posterior, medial, lateral, superior and inferior are defined by their standard usage for indicating a particular part of an instrument according to the relative disposition of the directional terms of reference. For example, "proximal" means the portion of a device nearest the torso, while "distal" indicates the portion of the device farthest from the torso. As for directional terms, "anterior" is a direction towards the front side of the body or object, "posterior" means a direction towards the back side of the body or object, "medial" means towards the midline of the body or object, "lateral" is a direction towards the sides or away from the midline of the body or object, "superior" means a direction above and "inferior" means a direction below another object or structure.

Referring to the drawings, wherein like reference numerals are used to indicate like or analogous components throughout the several views, and with particular reference to FIGS. 1-41, there are illustrated the components of a cart stabilization system 100. The cart stabilization system 100 may include a base 110 and a plurality of lifting caster systems 104. The cart stabilization system 100 may also include a robot 102. The base 110 may receive the robot 102 or the robots support structure on a top surface 120 of the base 110. The base 110 may be, for example, any polygonal shape to correspond to the shape of the robot 102 or the robot's support structure that engages the base 110.

As shown in FIGS. 2-11, the lifting caster system 104 may include a first end portion, a plurality of rolling cart elements, rolling elements, or casters 130, an intermediate portion or swivel foot assembly 220, and a second end portion or hydraulic mounting base 340. The cart stabilization system 100 may also include a hydraulic system, which may be driven by a custom manifold block populated with standard hydraulic cavity elements to control flow, a pressure sensor, and custom pedals to actuate the pump and release valve.

With reference again to FIGS. 1-11, the cart stabilization system 100 supports the weight of the robot 102 and stabilizes the rolling base 110 coupled to or supporting the robot 102. The system 100 is configured to stabilize the robot 102 to provide a solid ground path to react to internal forces during operation of the robot 102 in order to reduce robot error due to movement during use. For example, heavy pieces of surgical equipment, such as surgical robots, need to be easily moveable throughout a hospital or ambulatory center while also being highly stable during active use. In order to be highly stable during active use, the rolling elements 130 of the cart stabilization system 100 need to be reliable, quick and easy to operate. Although robot 102 is shown as a surgical robot, in other embodiments, the robot 102 may be configured as a manufacturing, industrial, or other non-surgical robotic device or system. The term "surgical robot" as used herein in reference to the exemplary illustrative robot or robotic system 102 shown in FIG. 1 is not meant in a limiting sense, and any and all description herein directed to a "surgical robot 102" or the like equally applies to a generic robot/robotic system or a manufacturing, industrial, or other non-surgical robot or robotic system.

With reference again to FIG. 1, the cart stabilization system 100 is passively stable and must be energized to bring the base to a mobile state. The cart stabilization system 100 may, for example, use hydraulics to actuate the mounting point for the rolling elements 130 (FIGS. 2-13), while providing a rigid foot that can follow any swiveling action of the rolling elements 130.

Figure 38:
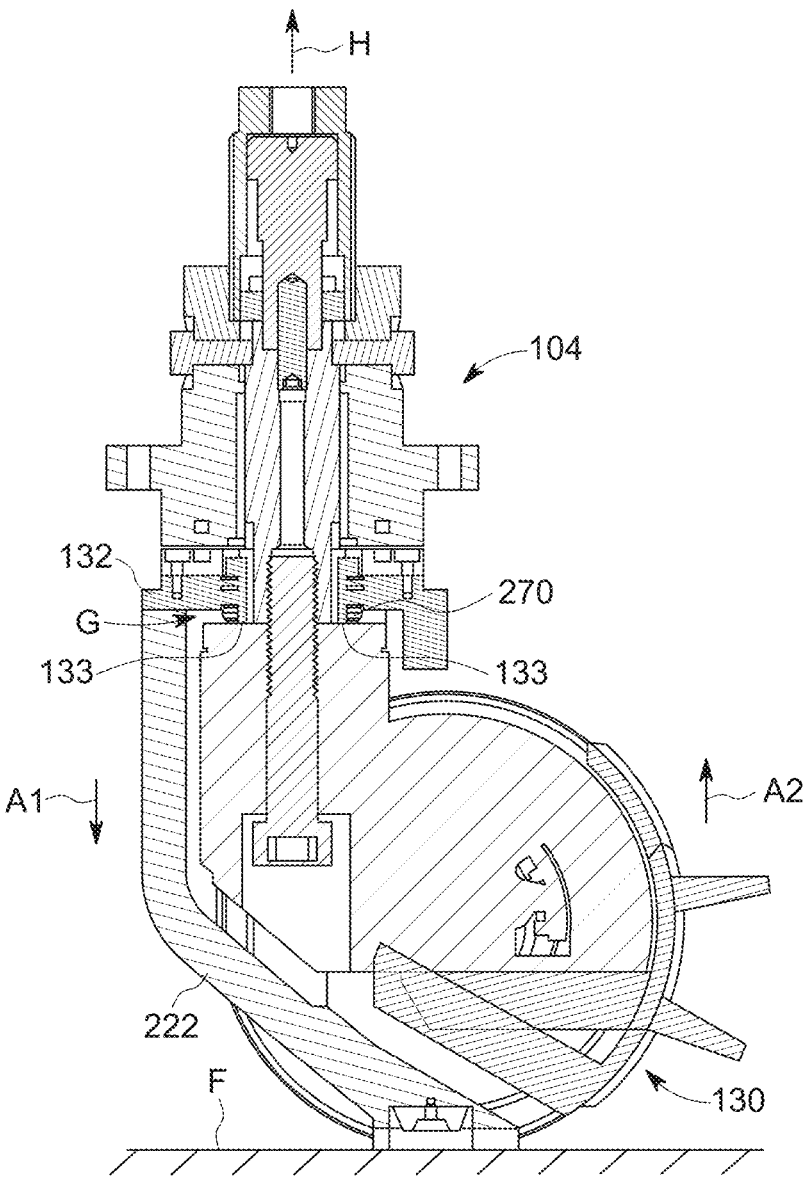
FIG. 38 is a cross-sectional view of the lifting caster system of FIG. 2, taken along line 10-10 in FIG. 8, in an energized mobile state, in accordance with an aspect of the present disclosure.

The cart stabilization system 100 is at rest and passively stable when pressure is relieved. For example, the weight of the base 110 and robot 102 compresses the cylinder-shaft-caster assemblies 104, one of which is shown in FIG. 38, forcing hydraulic fluid H to flow out, foot base 222 to move downwardly in the direction of arrow A1 and/or rolling element 130 to move upwardly in the direction of arrow A2 until a small clearance gap G between the foot base 222 and the base member 132 closes. The small clearance gap includes and/or is maintained by a spring 270 such as a wave spring and/or a stop 133. When the gap G is closed, the weight of the robot base 110 (FIG. 1) passes directly through the foot base 222 to the surface of the floor F below each rolling element 130.

Figure 39:
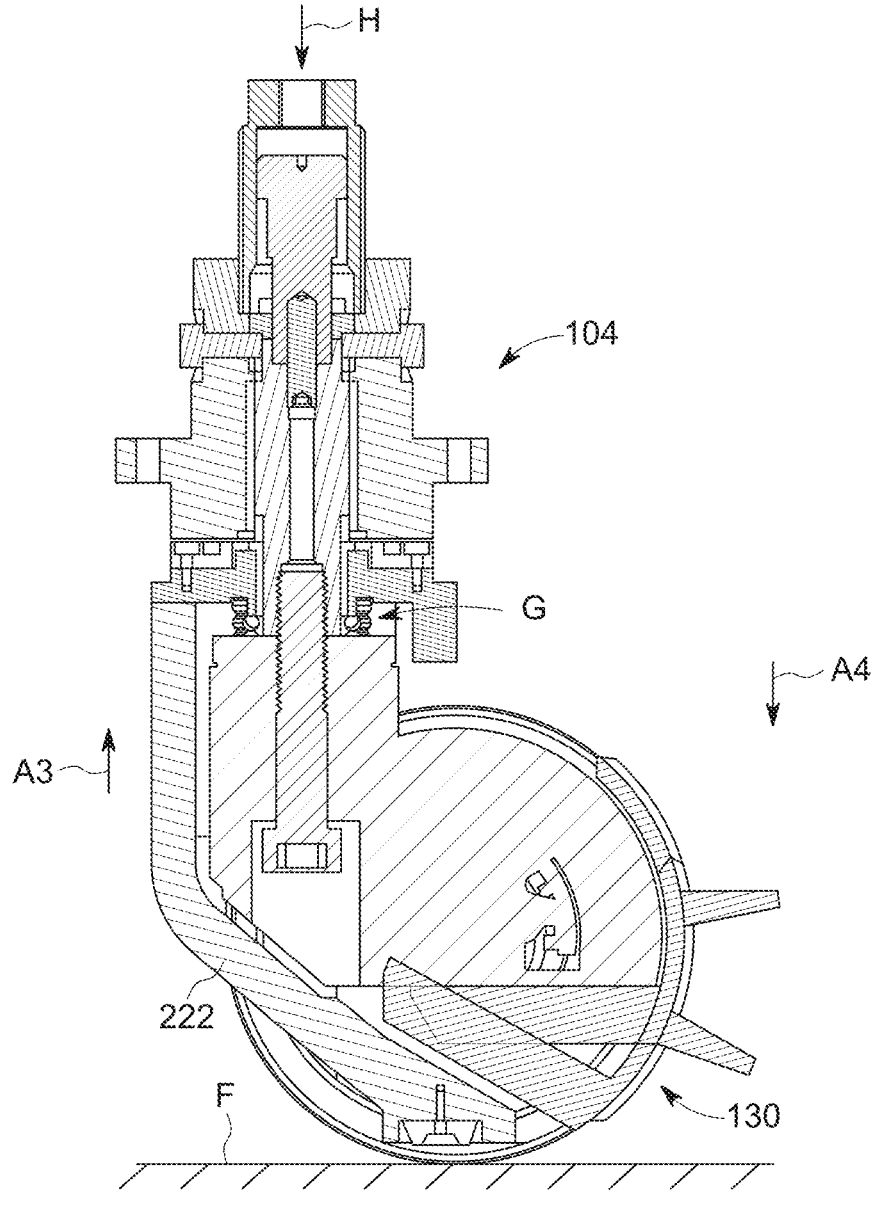
FIG. 39 is a cross-sectional view of the lifting caster system of FIG. 2, taken along line 10-10 in FIG. 8, in a passive stable state, in accordance with an aspect of the present disclosure.

To make the cart stabilization system 100 mobile, for example as shown in FIG. 39, a hydraulic pump can be used to force the hydraulic fluid H to extend portions of the cylinder-shaft-caster assembly 104 to a fixed height, for example, foot base 222 moves upwardly in the direction of arrow A3 and/or rolling element 130 moves downwardly in the direction of arrow A4.

Once at the fixed height, the foot base 222 is no longer in contact with the floor F and the gap G is expands and allows for the rolling elements 130 to engage the floor F, foot base 222 moving away from the surface of the floor, and allow swiveling of the foot base 222 with the rolling element 130.

As diagrammatically illustrated in FIG. 40, the cart stabilization system 100 may, for example, also include the robot 102, a controller or control system 500, a hydraulic pump or system 550, a manifold 560, a pressure sensor 580 for providing feedback to the control system 500 that notifies the user or prevents use of the cart 100 until the pressure drops below a threshold known to indicate the caster systems 104 are fully at rest. The controller or control system may include a processor of a general purpose computer, a computer readable storage medium, and Input/Output or I/O devices operably connected and as described further below.

With reference again to FIGS. 1 and 38-40, with the cart stabilization system 100 passively stable, the system 100 does not require energy to stabilize the base 110. Thus, a failure in the system 100 to supply energy during use will not result in a loss of stability. In addition, a release of pressure can more quickly bring the base 110 to a stable state, decreasing deployment time. Also, as discussed in greater detail below, by positioning the rigid feet bases 222 within the rolling elements 130, no compromise needs to be made in selecting if the rolling elements 130 or the feet bases 222 are positioned further. The positioning of the feet bases 222 relative to the rolling elements 130 may, for example, provide a more stable footprint for the system 100 for both mobile and stationary stability. The system 100 may also include, for example, a locking mechanism in rolling elements 130 when the rolling elements 130 are extended.

The lifting caster system 104 includes a shaft-piston assembly external to the hydraulic element that is keyed to retain the ability to fully lock the rolling elements 130. Thus, the hydraulic elements of the system can be fully assembled, filled, and tested prior to integration with other components. After the mounting bases have been attached to the cylinders, the system 100 can be installed from inside the cart base 110 with no need to break the hydraulic connections.

With reference again to FIGS. 1-13 and reference to FIGS. 14-21, the first end portion, rolling cart elements, rolling elements, or casters 130 are shown. The first end portion 130 may be, for example, standard total lock casters, as well as alternative casters or rolling elements that allow for fixing the wheels from both rolling and rotating. The casters 130 each include a base member 132 with two wheels 154, 166 and two brakes 180, 192 moveably coupled to the base member 132. In addition, the casters 130 each receive a fastener or screw 204 (FIGS. 10 and 11) for attaching the caster 130 to the rest of the lifting caster system 104. The base member 132 includes a through hole 134 extending from a top of the base member 132 through to the bottom of the base member 132. The casters 130 also include a cover 136 (FIG. 12) extending from the base member 132. The cover 136 may be, for example, arched or curved to position the cover over the wheels 154, 166.

Figure 10:
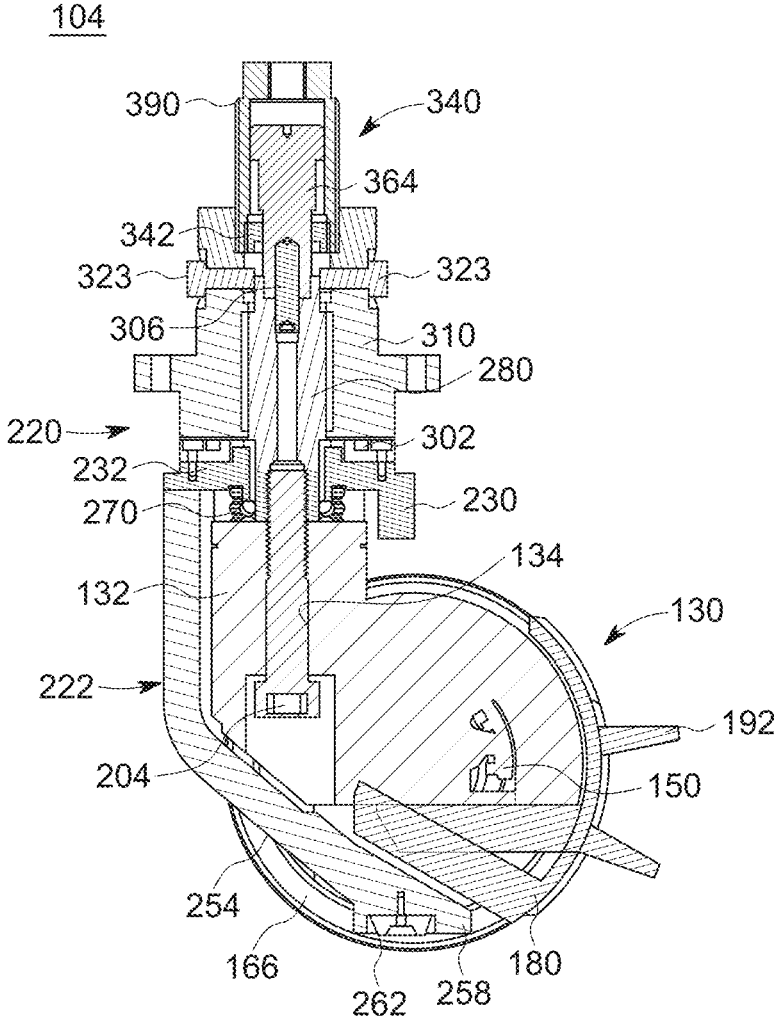
FIG. 10 is a cross-sectional view of the lifting caster system of FIG. 2, taken along line 10-10 in FIG. 8, in accordance with an aspect of the present disclosure.
Figure 11:
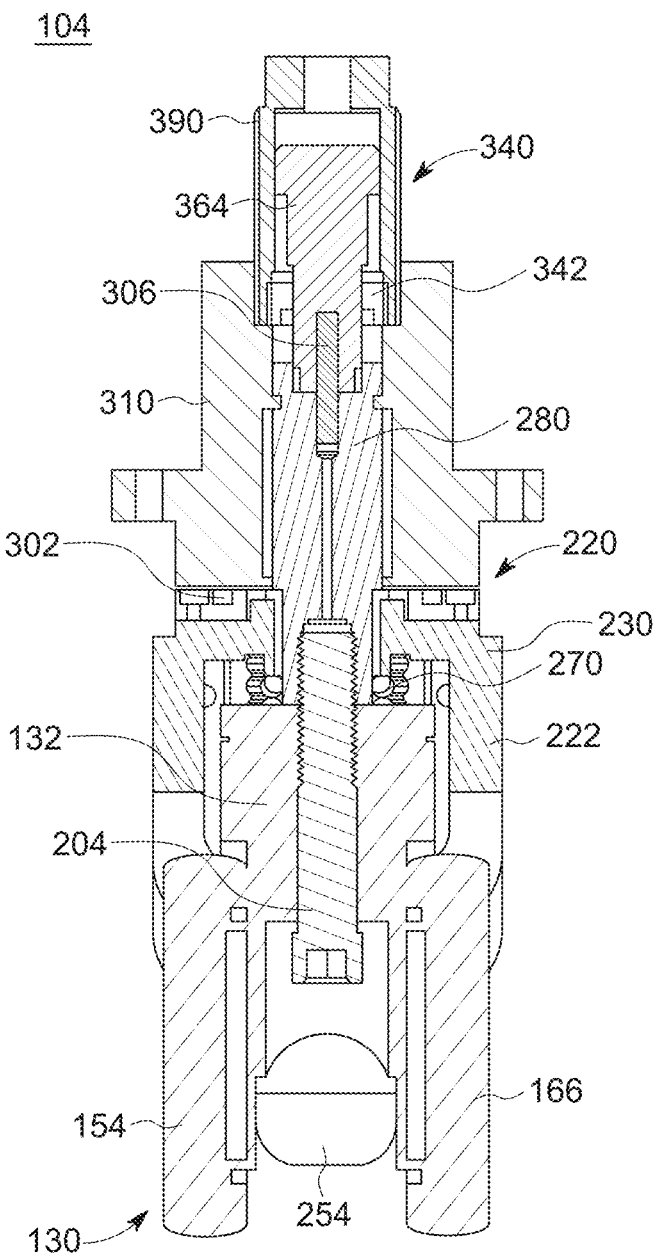
FIG. 11 is a cross-sectional view of the lifting caster system of FIG. 2, taken along line 11-11 in FIG. 8, in accordance with an aspect of the present disclosure.
Figure 12:
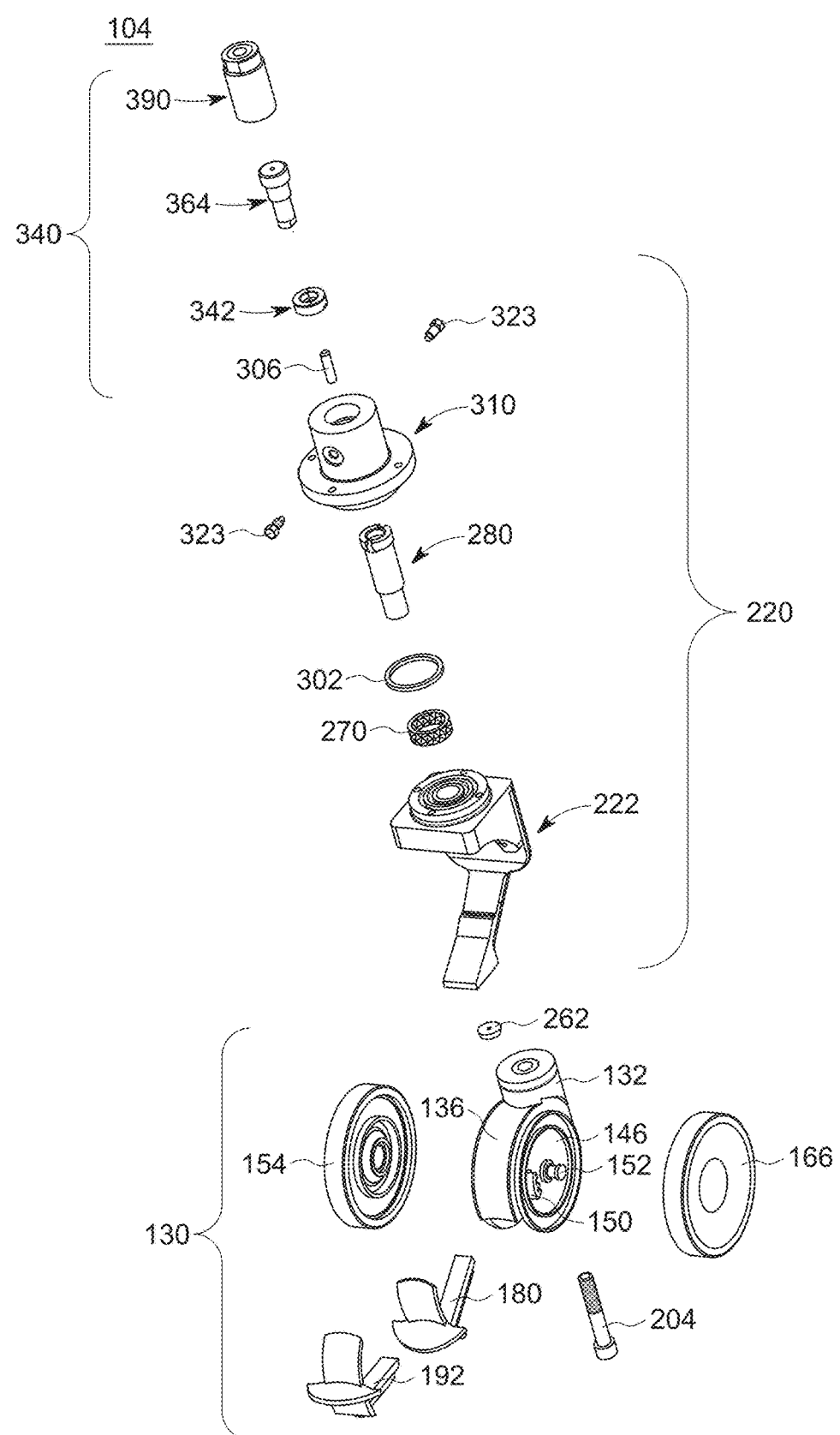
FIG. 12 is an exploded, first perspective view of the lifting caster system of FIG. 2, in accordance with an aspect of the present disclosure.
Figure 13:
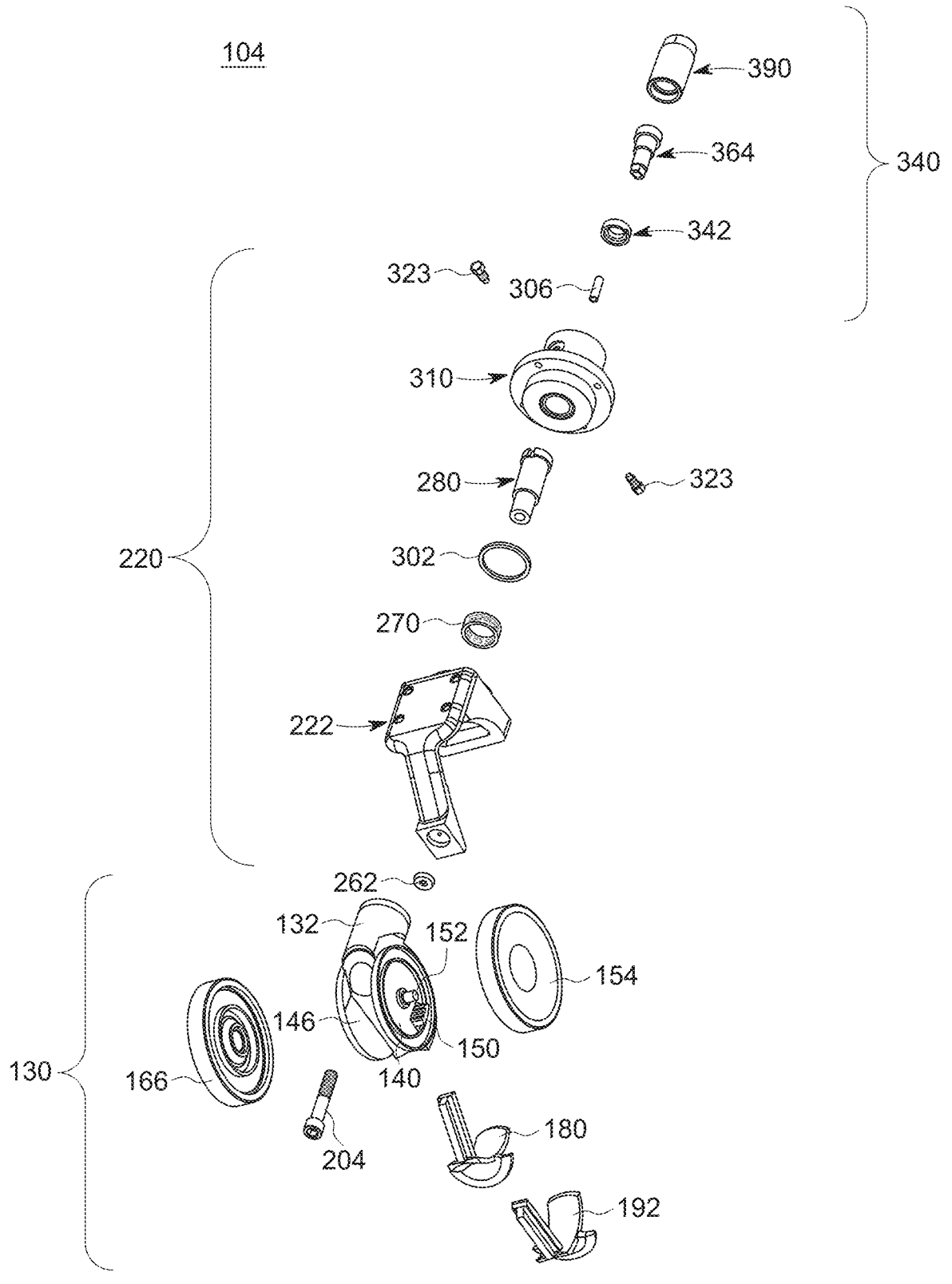
FIG. 13 is an exploded, second perspective view of the lifting caster system of FIG. 2, in accordance with an aspect of the present disclosure.
Figure 14:
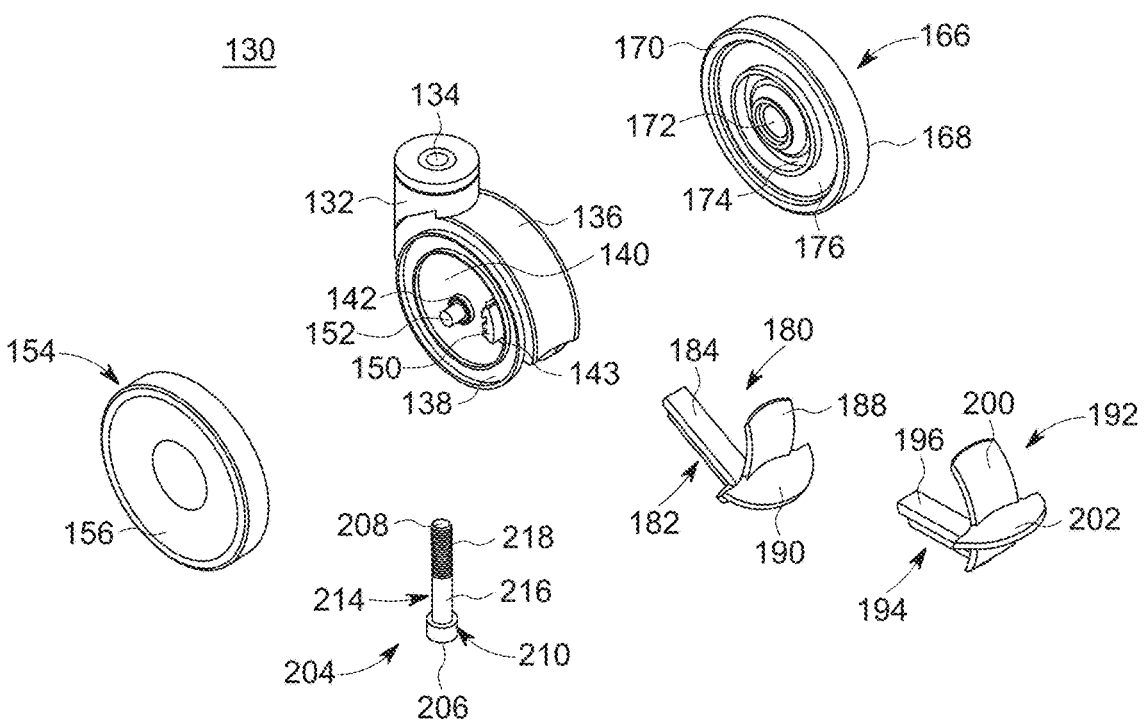
FIG. 14 is an exploded, first perspective view of a first end portion of the lifting caster system of FIG. 2, in accordance with an aspect of the present disclosure.
Figure 15:
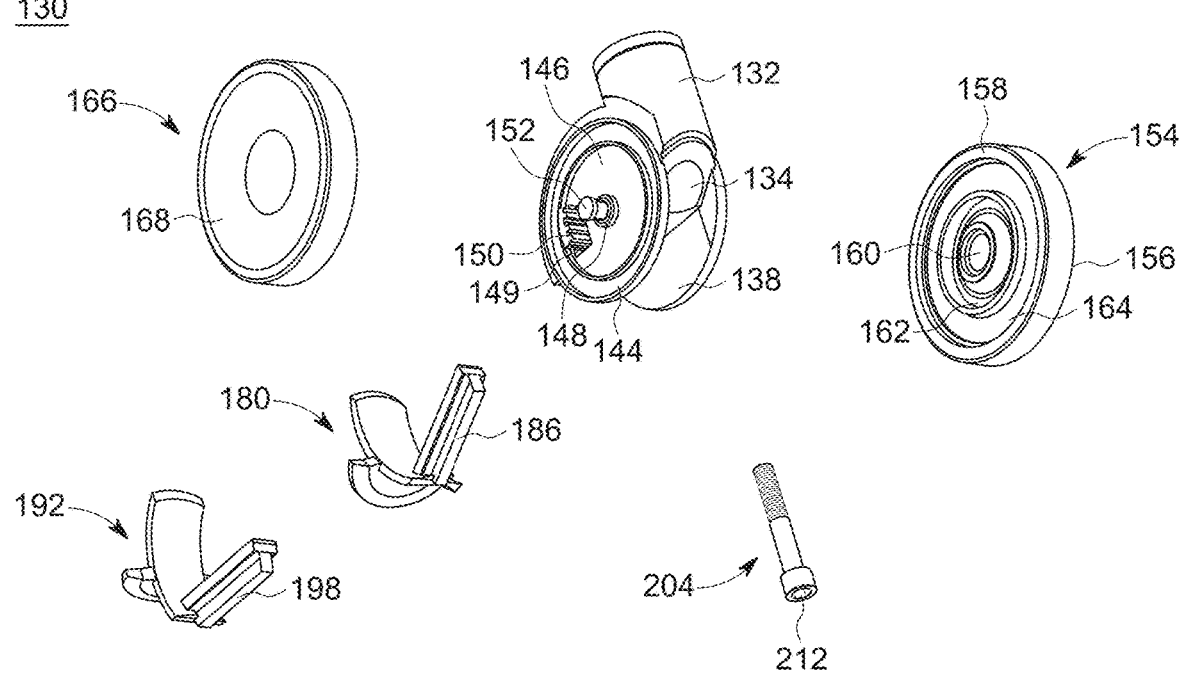
FIG. 15 is an exploded, second perspective view of the first end portion of FIG. 14, in accordance with an aspect of the present disclosure.
Figures 16, 17:
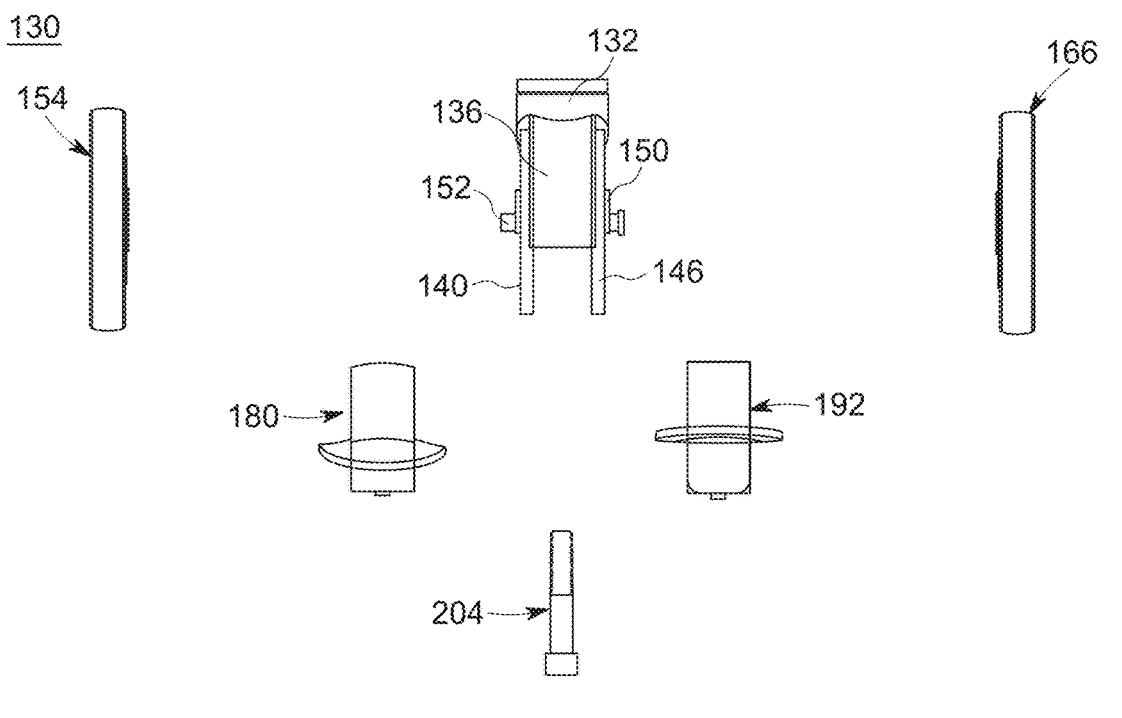
FIG. 16 is an exploded, first end view of the first end portion of FIG. 14, in accordance with an aspect of the present disclosure.
FIG. 17 is an exploded, second end view of the first end portion of FIG. 14, in accordance with an aspect of the present disclosure.
Figure 18:
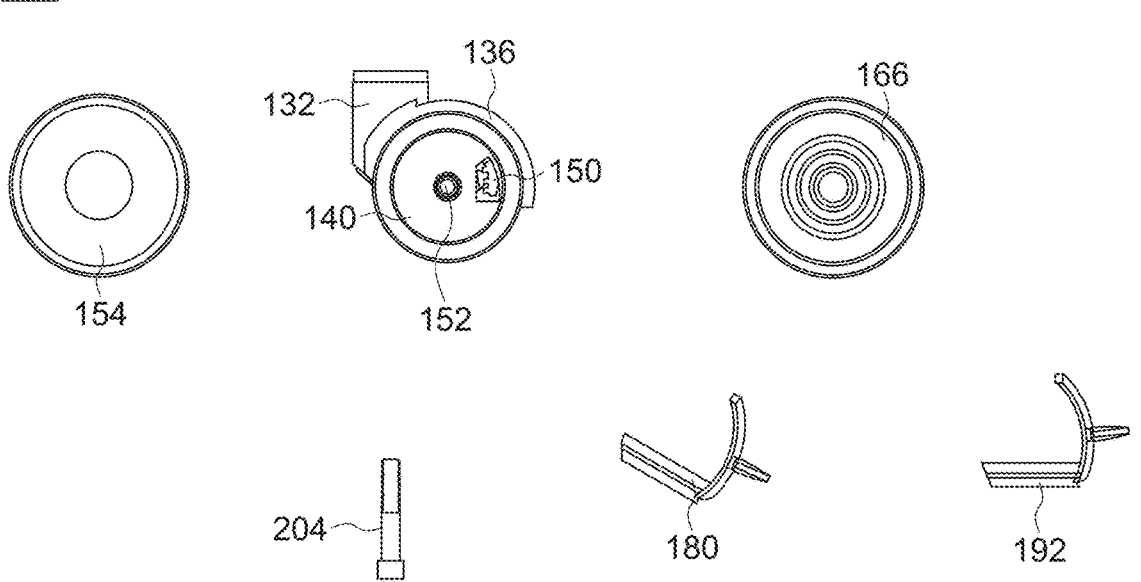
FIG. 18 is an exploded, first side view of the first end portion of FIG. 14, in accordance with an aspect of the present disclosure.
Figure 19:
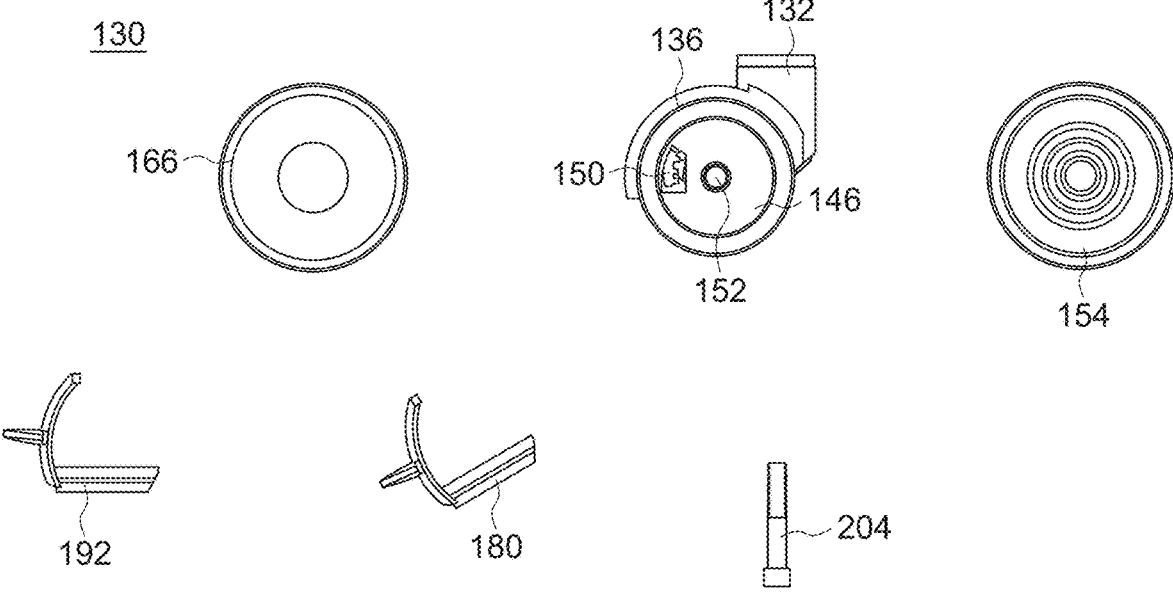
FIG. 19 is an exploded, second side view of the first end portion of FIG. 14, in accordance with an aspect of the present disclosure.
Figure 20:
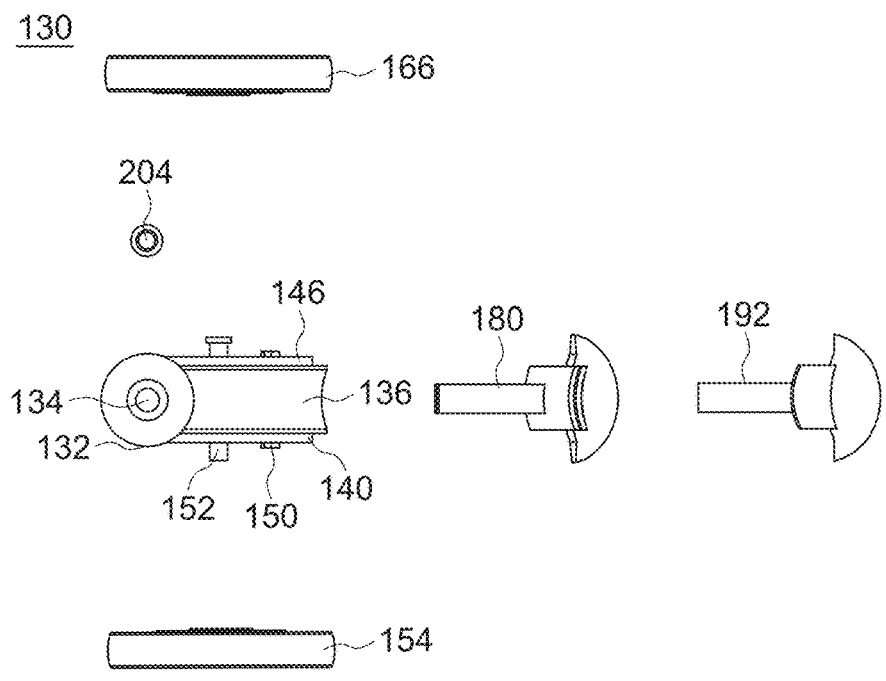
FIG. 20 is a top view of the first end portion of FIG. 14, in accordance with an aspect of the present disclosure.
Figure 21:
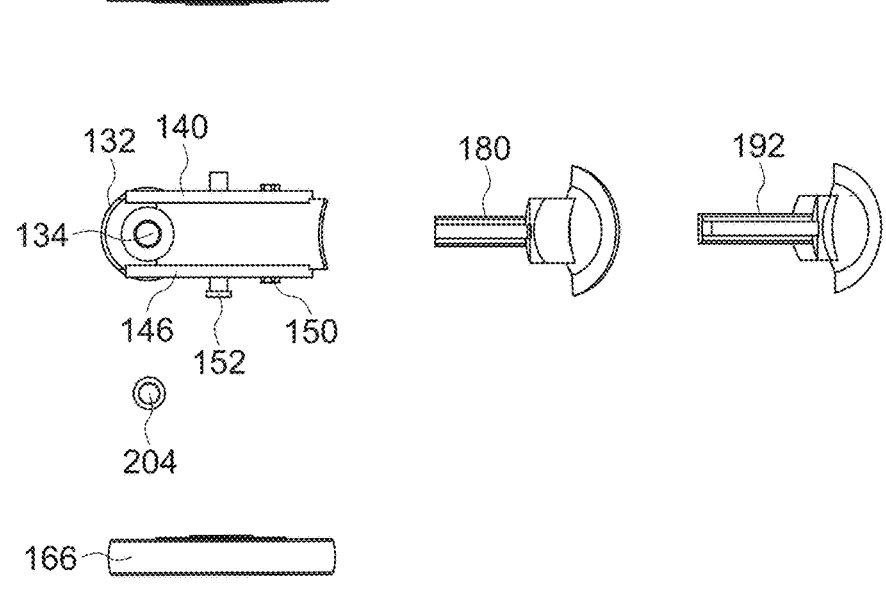
FIG. 21 is a bottom view of the first end portion of FIG. 14, in accordance with an aspect of the present disclosure.

In addition, as shown in FIGS. 14-21, the casters 130 include a first leg or first fork 138 coupled to and extending from a first portion of the base member 132 and a second leg or second fork 144 coupled to and extending from a second portion of the base member 132. The first leg 138 may be, for example, round or circular to correspond to the shape of the wheel 154. The first leg 138 may include an exterior surface 140 for receiving the wheel 154. In addition, the first leg 138 may include an opening 142 positioned in the center of the first leg 138 and extending through the first leg 138 from the exterior surface 140 through the caster 130 and through the second leg 144. The first leg 138 may further include a through hole 143 positioned between the opening 142 and an outer rim of the first leg 138. The through hole 143 may extend through the first leg 138. The second leg 144 may be, for example, round or circular to correspond to the shape of the wheel 166. The second leg 144 may include an exterior surface 146 for receiving the wheel 166. In addition, the second leg 144 may include an opening 148 positioned in the center of the second leg 144 and extending through the second leg 144 from the exterior surface 146 through the caster 130 and through the first leg 138. The opening 142 and opening 148 intersect within the caster 130 to form an opening 142, 148 that extends from the exterior surface 140 of the first leg 138 to the exterior surface 146 of the second leg 144. The opening 142, 148 is sized and shaped to receive an axle or axle bolt 152 for securing the wheels 154, 166 to the base member 132. The second leg 144 may further include a through hole 149 positioned between the opening 148 and an outer rim of the second leg 144. The through hole 149 may extend through the second leg 149. The through hole 143 and the through hole 149 intersect to form a passageway through the casters 130 for receiving a break member 150 (FIG. 10). A portion of the break member 150 (FIG. 10) may extend out of each of the through holes 143, 149 to engage a portion of each wheel 154, 166, respectively.

With continued reference to FIGS. 14-21, the first wheel 154 is shown and includes an exterior surface 156 opposite an interior surface 158. The first wheel 154 may also include an opening 160 positioned, for example, in a center of the wheel 154. Surrounding the opening 160 on the interior surface 158 is an inner channel 162 and an outer channel 164. The channels 162, 164 extend circumferentially around the interior surface 158 of the wheel 154. The inner channel 162 receives a portion of the brake member 150 (FIG. 10) to assist with securing the wheel 154 in place when desired. The second wheel 166 is shown and includes an exterior surface 168 opposite an interior surface 170. The second wheel 166 may also include an opening 172 positioned, for example, in a center of the wheel 166. Surrounding the opening 172 on the interior surface 170 is an inner channel 174 and an outer channel 176. The channels 174, 176 extend circumferentially around the interior surface 170 of the wheel 166. The inner channel 174 receives a portion of the brake member 150 (FIG. 10) to assist with securing the wheel 166 in place when desired.

The first brake 180 and second brake 192 are also shown in FIGS. 14-21. The first brake 180 includes a base member 182. The base member 182 includes a top portion 184 and a bottom portion 186. The top portion 184 and bottom portion 186 may form, for example, a "T" shape. The first brake 180 may also include an extension member 188 extending from a first end of the base member 182. The extension member 188 may be, for example, curved from the point of attachment to the base member 182 at its first end to a second end, which may be a free end. The extension member 188 may have, for example, a concave curvature on the side coupled to the base member 182. The first brake 180 may also include a first pedal or foot pedal 190 coupled to and extending from the extension member 188 on a side opposite the base member 182. The first pedal 190 may be, for example, positioned between the first end and the second end of the extension member 188. The first pedal 190 may have, for example, a curved or semicircular shape.

The second brake 192 includes a base member 194. The base member 194 includes a top portion 196 and a bottom portion 198. The top portion 196 and bottom portion 198 may form, for example, a "T" shape. The second brake 192 may also include an extension member 200 extending from a first end of the base member 194. The extension member 200 may be, for example, curved from the point of attachment to the base member 194 at its first end to a second end, which may be a free end. The extension member 200 may have, for example, a concave curvature on the side coupled to the base member 194. The second brake 192 may also include a second pedal or foot pedal 202 coupled to and extending from the extension member 200 on a side opposite the base member 194. The second pedal 202 may be, for example, positioned between the first end and the second end of the extension member 200. The second pedal 202 may have, for example, a curved or semicircular shape. The second ends of the base members 182, 194 of the brakes 180, 192 each extend into and couple to the base member 132 of the casters 130. The base members 182, 194 of the brakes 180, 192 are movable relative to the base member 132 and can engage the brake member 150 to secure the wheels 154, 166 in a locked position when desired.

The casters 130 also include a fastener or screw 204, as shown in FIGS. 14-21. The fastener 204 may be used to couple the casters 130 to the foot assembly 220 and hydraulic mounting base 340. The fastener 204 has a first end 206 opposite a second end 208. The first end 206 includes a head 210 with a drive opening 212 extending into the head 210 from the first end 206. The fastener 204 also includes a shaft 214 extending from the second end 208 to the head 210. The shaft 214 may include, for example, a smooth portion 216 and a threaded portion 218. Although shown with half the shaft 214 being a smooth portion 216 and half being a threaded portion 218, alternative amounts of smooth and threads are also contemplated in order to ensure engagement with the rest of the lifting caster system 104. The second end 208 of the fastener 204 may be inserted through the through hole 134 from a second end of the base member 132. At least a portion of the shaft 214 will extend from the first end of the base member 132.

Referring now to FIGS. 22-29, the intermediate portion, swivel foot assembly, or foot assembly 220 is shown. The foot assembly 220 includes a foot base or swivel foot multibody 222, a spring 270, a lifting shaft 280, an O-ring 302, and a foot mount 310. The foot assembly 220 may be coupled to the hydraulic mounting base 340 with, for example, a set screw 306. The foot base 222 includes a first end 224 and a second end 226. A baseplate 228 extends from the first end 222 towards the second end 224. The baseplate 228 includes a plurality of openings 229 for receiving fasteners. The baseplate 228 may have, for example, a generally square or rectangular shape with rounded corners. The foot base 222 may also include an extension member 230 attached to the baseplate 228 by inserting screws through the openings 229 and into openings in the extension member 230. The extension member 230 may include a housing 232 extending away from a top surface of the extension member 230. The housing 232 may have, for example, a round or circular shape. The housing 232 may be, for example, separate from the extension member 230 or integral with the extension member 230. The housing 232 may include a through hole 234 extending through a center of the housing 232. The housing 232 may also include a first channel 236 inset into a top surface of the housing 232 between the through hole 234 and the exterior side surface of the housing 232. The housing 232 may further include a plurality of holes 238 extending through the housing 232 from a top surface to a bottom surface. In addition, the plurality of holes 238 may be positioned circumferentially around the housing 232 between the first channel 236 and the exterior side surface.

Figure 7:
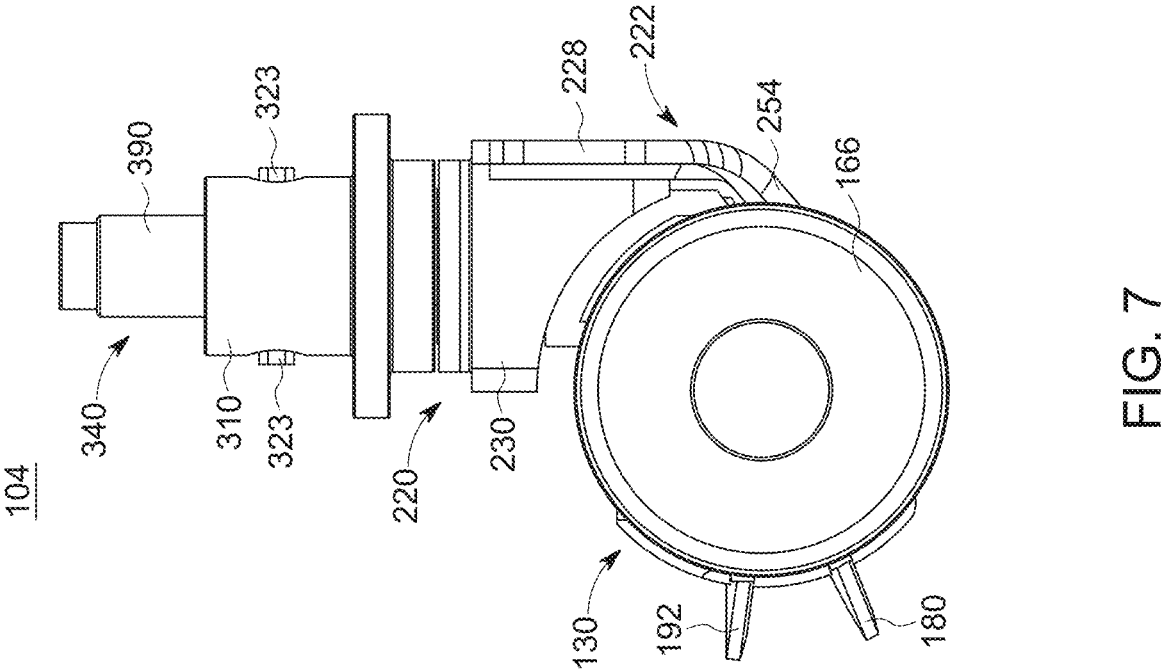
FIG. 7 is a second side view of the lifting caster system of FIG. 2, in accordance with an aspect of the present disclosure.
Figure 6:
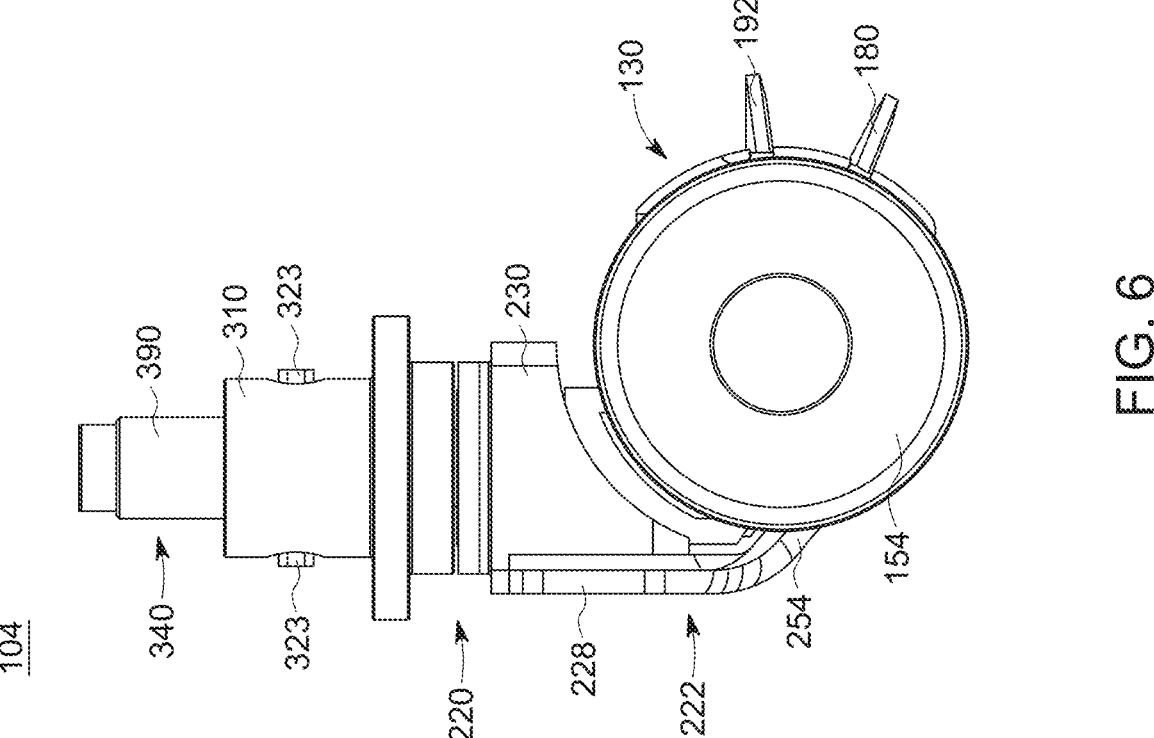
FIG. 6 is a first side view of the lifting caster system of FIG. 2, in accordance with an aspect of the present disclosure.
Figure 8:
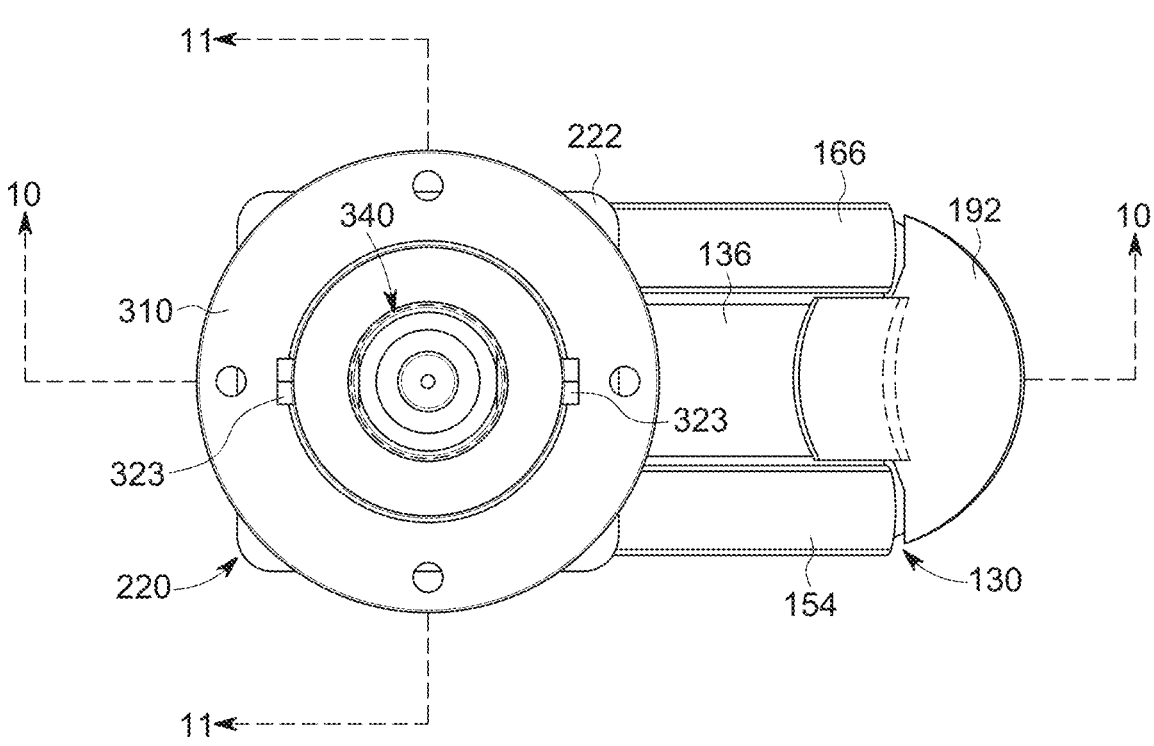
FIG. 8 is a top view of the lifting caster system of FIG. 2, in accordance with an aspect of the present disclosure.
Figure 9:
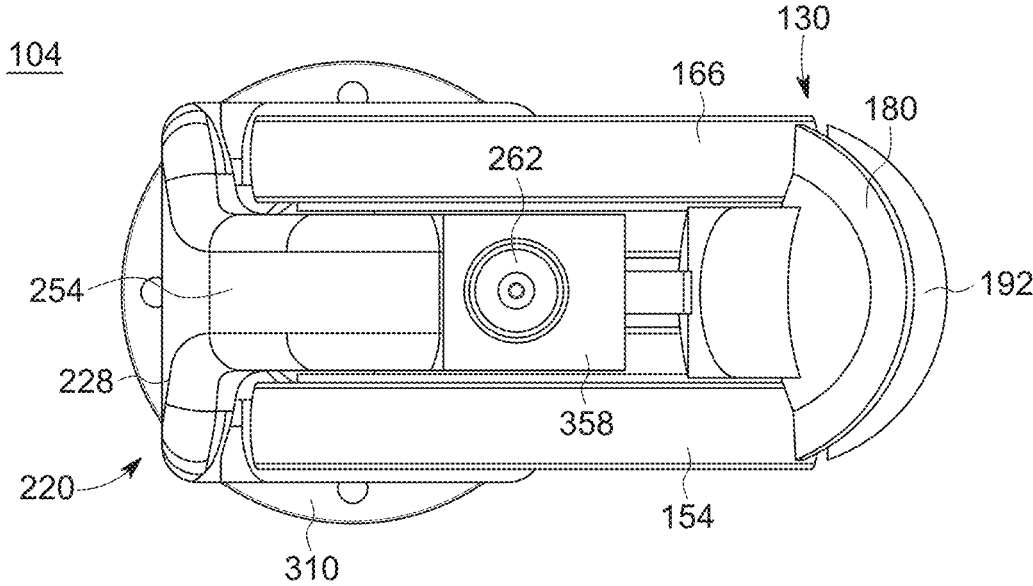
FIG. 9 is a bottom view of the lifting caster system of FIG. 2, in accordance with an aspect of the present disclosure.

With continued reference to FIGS. 22-29, the extension member 230 may also include a swivel housing 240 (FIG. 22) positioned within the through hole 234 to enable the foot base to rotate about an axis extending through the center of the through hole 234. The swivel housing 240 includes a through hole 242 extending through a center of the swivel housing 240 from a top surface to a bottom surface. When inserted into the through hole 234 the swivel housing 240 forms a second channel 244 between an exterior surface of the swivel housing 240 and the interior surface of the housing 232. The extension member 230 also includes a first end 246 and a second end 248 opposite the first end 246. The second end 248 is the side coupled to the baseplate 228. The second end 248 may be, for example, longer than the first end 246. In addition, the extension member 230 includes side members 250 extending between and coupling the first end 246 to the second end 248. The side members 250 may be, for example, curved or arced as the side members 250 extend from the first end 246 to the second end 248. The extension member 230 further includes a recessed region 252 extending into the extension member 230 from a bottom surface. The foot base 222 also includes a leg member 254 extending from a bottom of the baseplate 228. The leg member 254 may extend from the baseplate 228 at an angle, for example, to position a portion of the leg member 254 distal to the extension member 230. The leg member 254 may also include a neck region 256 at the first end, where the leg member 254 is coupled to the baseplate 228. The neck region 256 may be tapered as it extends from the baseplate 228, with a first width, to the leg member 254, which has a second width. The first width being larger than the second width. The second end of the leg member 254 may include a foot 258. The foot 258 is, for example, sized and shaped to engage the floor. The foot 258 may have an angled top surface and a flat or planar bottom surface. The bottom surface may also include a hole 260 recessed into the foot 258. The hole may be sized and shaped to receive a bumper 262. A first portion of the bumper 262 is received within the hole 260 and a second portion of the bumper 262 extends out from the bottom surface of the foot 258 and engages the floor. As shown in FIGS. 6, 7 and 10, the leg member 254 and base member 132 are positioned between the two wheels 154, 166 to allow for obstacle clearance. Specifically, the angulation of the leg member 254 and position of the base member 132 provides greater clearance around the circumference of the wheels 154, 166 allowing for each lifting caster system 104 to have a greater clearance and enable the cart stabilization system 100 to be rolled into small steps or over cables and other obstacles more easily. The spring or wave spring 270 includes a top surface 272, a bottom surface 274 opposite the top surface 272, and a through hole 276 extending through the spring 270 from the top surface 272 to the bottom surface 274. The spring 270 may also include a plurality of openings 278 extending through the spring 270 from an exterior surface to the through hole 276.

As shown in FIGS. 22-29, the lifting shaft 280 includes a first end 282 and a second end 284 opposite the first end 282. The lifting shaft 280 includes a head 286 at the first end 282. The head 286 includes at least one key recess 288, 290 extending into an exterior surface of the head 286 from the first end 282 toward the second end 284. The at least one key recess 288, 290 includes a first key recess 288 and a second key recess 290 positioned on opposite sides of the head 286. The key recesses 288, 290 may be, for example, narrower at the top and wider at the bottom and a portion of the key recesses 288, 290 may have a triangular shape. The key recesses 288, 290 may receive a portion of the shafts of the set screws 323. The lifting shaft 280 may also include an inset opening 292 extending into the head 286 from the first end 282. The lifting shaft 280 may also include a through hole 294 extending from the first end 282 to the second end 284 of the lifting shaft 290 and through the inset opening 292. The lifting shaft 280 may further include a shaft 296 extending from a bottom of the head 286 to the second end 284 of the lifting shaft 280. The shaft 296 may include a first portion 298 extending from the bottom of the head 286 toward the second end 284 and a second portion 300 extending from a second end of the first portion 298 to the second end 284. The first portion 298 may have, for example, a diameter larger than the second portion 300, although alternative size arrangements are also contemplated. In addition, the head 286 may have a diameter larger than the diameters of both the first portion 298 and the second portion 300.

With continued reference to FIGS. 22-29, the foot assembly 220 also includes an O-ring 302. The O-ring 302 may be, for example, a square profile O-ring. The O-ring 302 may be received within the first channel 236 of the housing 232.

Finally, the foot assembly 220 includes a foot mount or swivel foot mount 310. The foot mount 310 includes a first end 312 and a second end 314 opposite the first end 312. The foot mount 310 also includes a first portion 316 extending from the first end 312 toward the second end 314, a second portion 326 extending from the second end 314 toward the first portion 312, and a third portion or protrusion 330 positioned between the first portion 316 and the second portion 326 and extending past the exterior surfaces of the first and second portions 316, 326. The foot mount 310 further includes a through hole 318 extending through the first portion 316, the second portion 326, and the third portion 330 from the first end 312 to the second end 314 of the foot mount. 310. The first portion 316 also includes at least one screw hole 320 extending through the first portion 316 from an exterior surface into the through hole 318. At least one recessed region 322 extends into a portion of the exterior surface of the first portion 316 surrounding the at least one screw hole 320. As shown, the at least one screw hole 320 may be, for example, two screw holes 320 positioned on opposite sides of the first portion 316. In addition, the at least one recessed region 322 may be, for example, two recessed regions 322 positioned to surround the two screw holes 320. The at least one screw hole 320 may receive at least one set screw 323. The at least one set screw 323 may be, for example, a hex head extended tip set screw. The at least one set screw 323 may be, for example, two set screws 323. The second end of the set screws 323 may be inserted into and engage the key recesses 288, 290 of the lifting shaft 280. The first portion 316 may further include at least one interior groove 324 inset into the interior surface of the first portion 316, extending from the through hole 318 toward the exterior surface.

Figure 22:
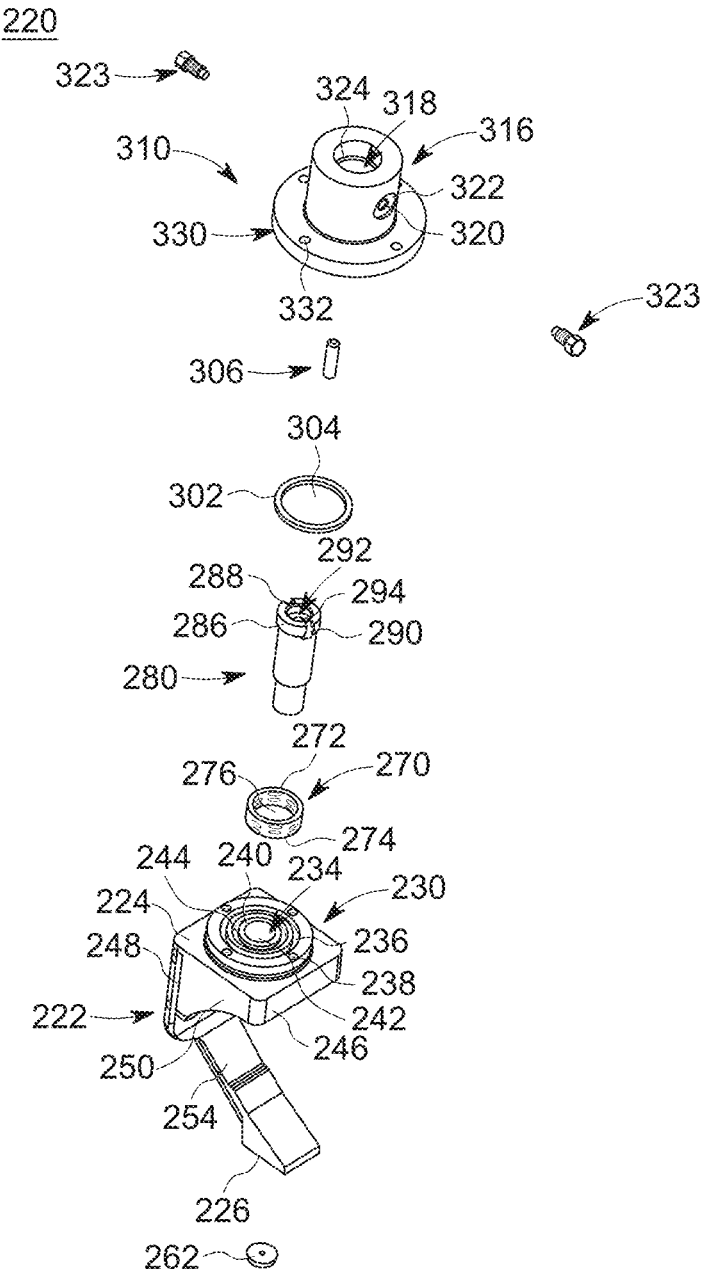
FIG. 22 is an exploded, first perspective view of an intermediate portion of the lifting caster system of FIG. 2, in accordance with an aspect of the present disclosure.
Figure 23:
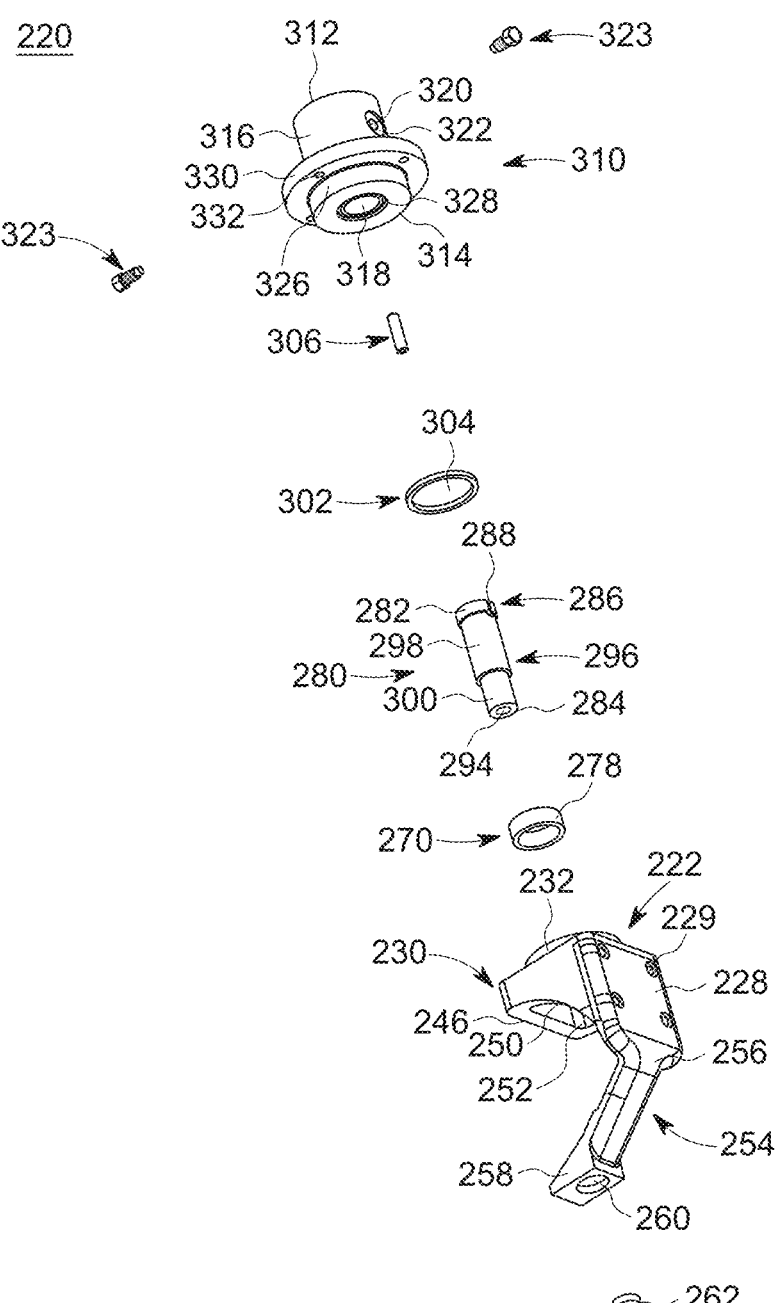
FIG. 23 is an exploded, second perspective view of the intermediate portion of FIG. 22, in accordance with an aspect of the present disclosure.
Figure 24:
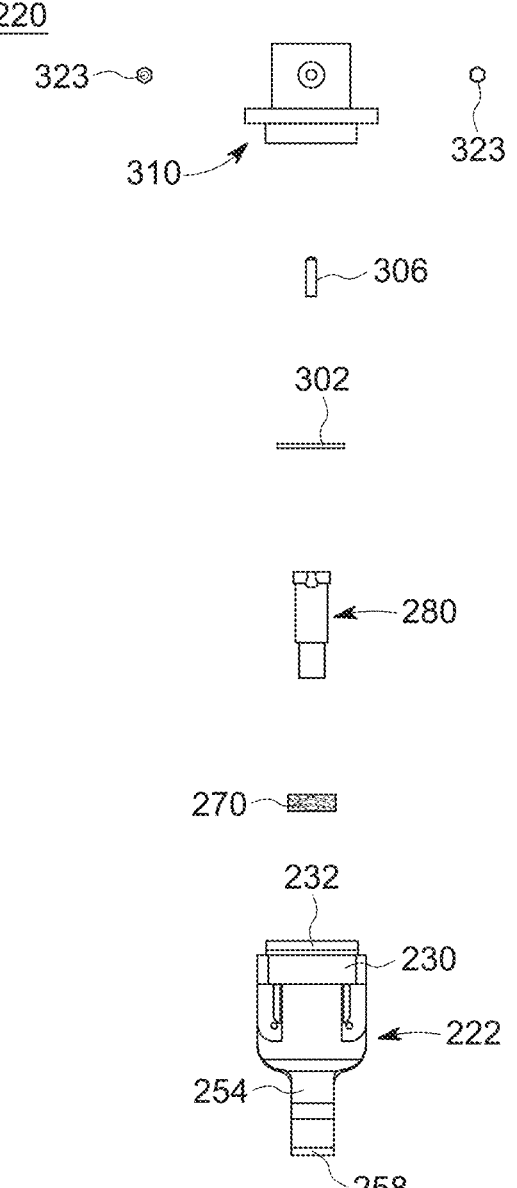
FIG. 24 is an exploded, first end view of the intermediate portion of FIG. 22, in accordance with an aspect of the present disclosure.
Figure 25:
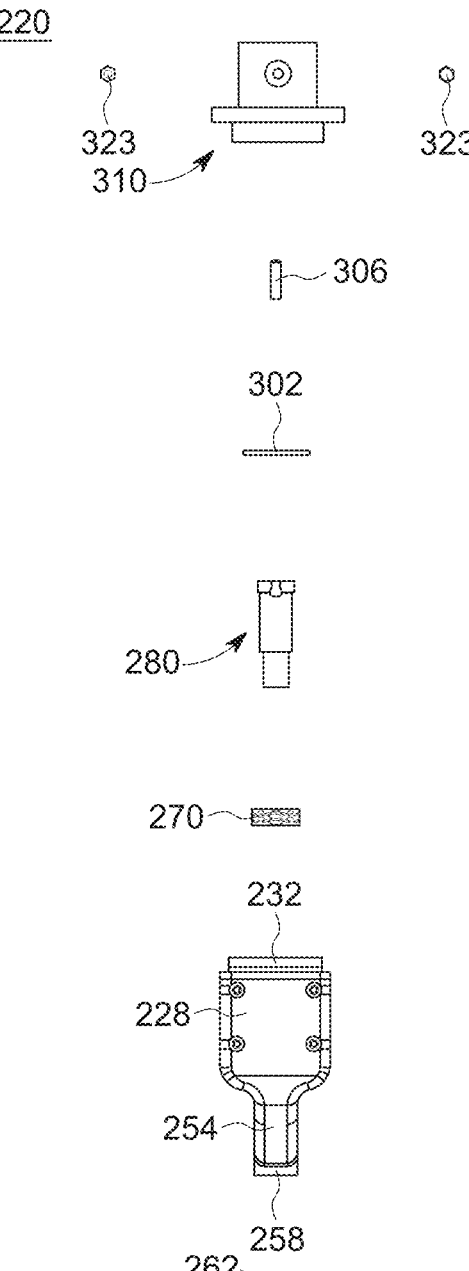
FIG. 25 is an exploded, second end view of the intermediate portion of FIG. 22, in accordance with an aspect of the present disclosure.
Figure 26:
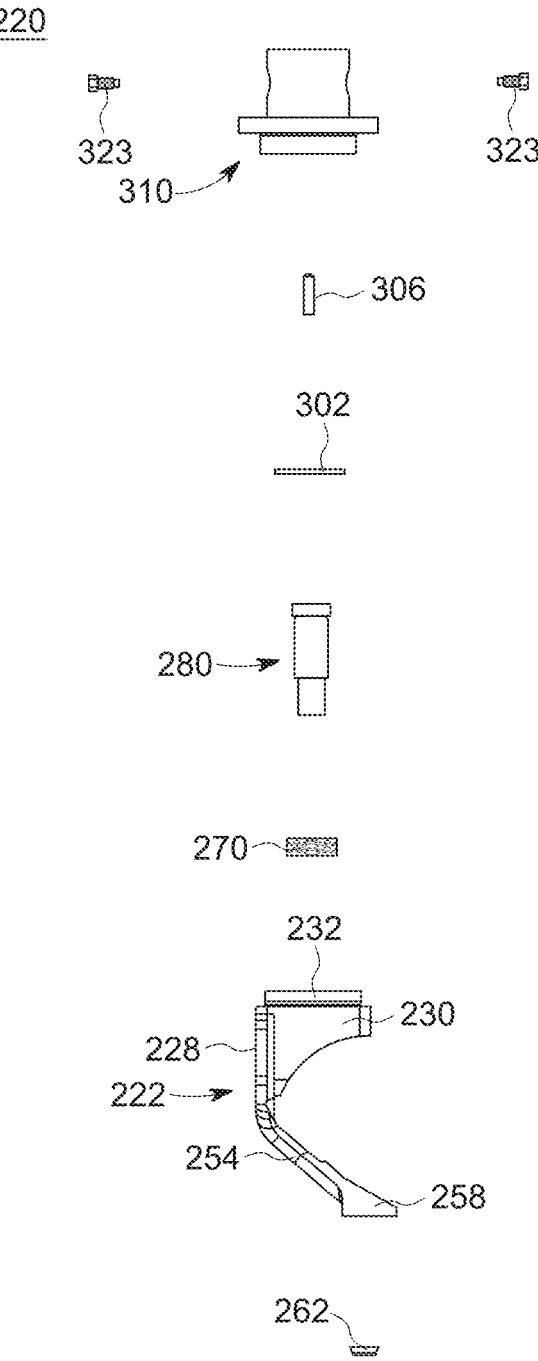
FIG. 26 is an exploded, first side view of the intermediate portion of FIG. 22, in accordance with an aspect of the present disclosure.
Figure 27:
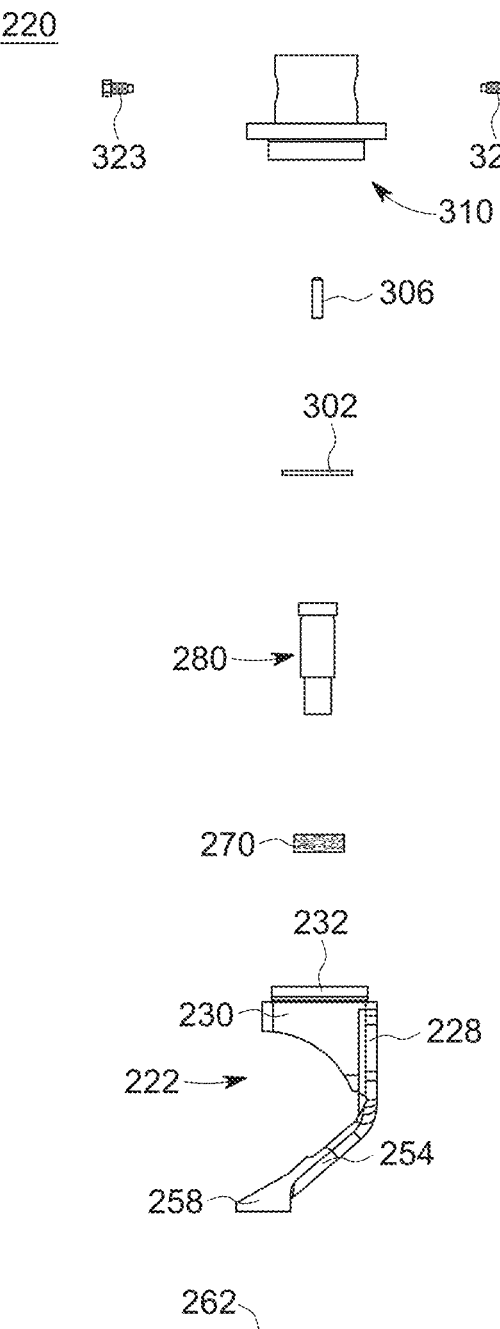
FIG. 27 is an exploded, second side view of the intermediate portion of FIG. 22, in accordance with an aspect of the present disclosure.
Figures 30, 31:
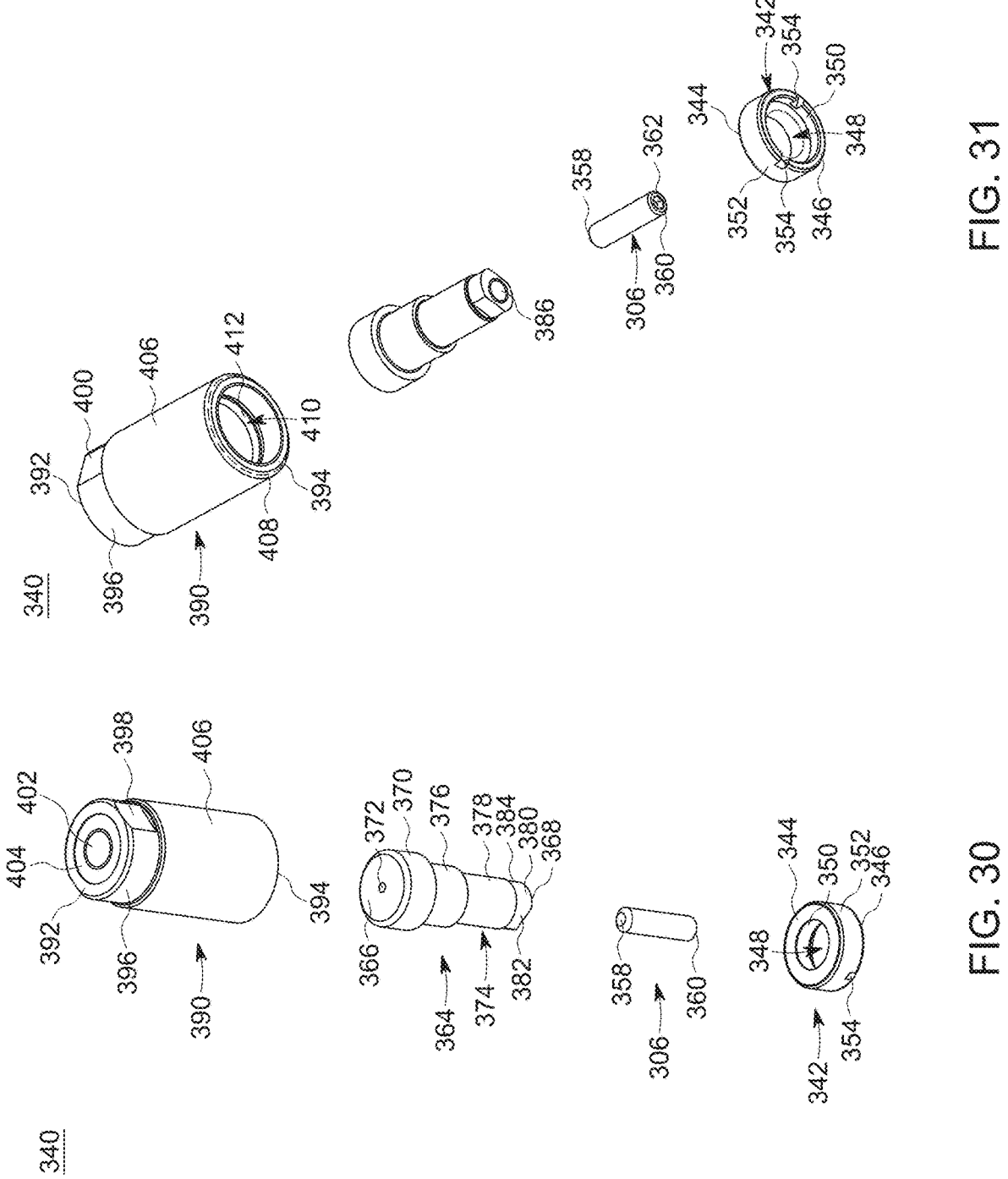
FIG. 30 is an exploded, first perspective view of a second end portion of the lifting caster system of FIG. 2, in accordance with an aspect of the present disclosure.
FIG. 31 is an exploded, second perspective view of the second end portion of FIG. 30, in accordance with an aspect of the present disclosure.
Figure 32:
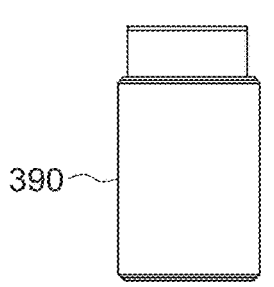
FIG. 32 is an exploded, first end view of the second end portion of FIG. 30, in accordance with an aspect of the present disclosure.
Figure 33:
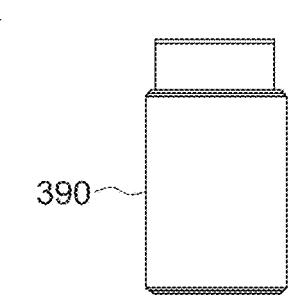
FIG. 33 is an exploded, second end view of the second end portion of FIG. 30, in accordance with an aspect of the present disclosure.
Figure 33:
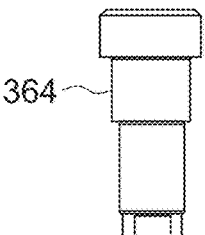
Figure 33:
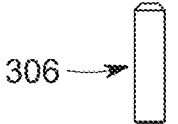
Figure 34:
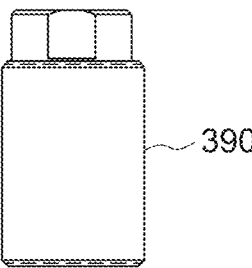
FIG. 34 is an exploded, first side view of the second end portion of FIG. 30, in accordance with an aspect of the present disclosure.
Figure 34:
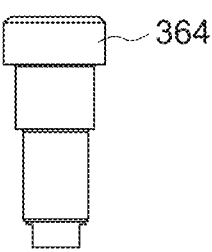
Figure 34:
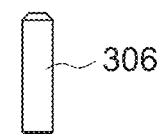
Figure 34:
Figure 35:
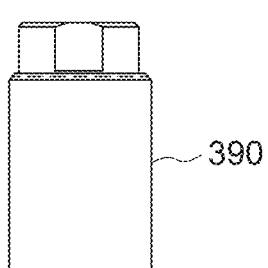
FIG. 35 is an exploded, second side view of the second end portion of FIG. 30, in accordance with an aspect of the present disclosure.
Figure 35:
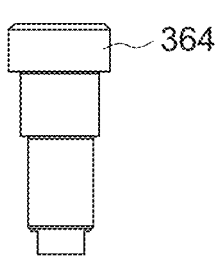
Figure 35:
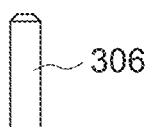
Figure 35:
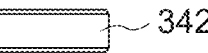

With continued reference to FIGS. 22-29, the second portion 326 includes a diameter and the diameter of the second portion 326 is larger than the diameter of the first portion 316. The through hole 318 also extends through the second portion 326. A swivel member 328 is positioned within the through hole 318 and extends from the second end 314 of the through hole 318 toward the first end 312. As seen in FIGS. 22 and 23, the through hole 318 may include different diameters along its length between the first end 312 and the second end 314. The diameter of the through hole 318 extending from the second end 314 corresponds to the diameter of the exterior surface of the swivel member 328. The first portion 298 of the lifting shaft 280 is received within the swivel member 328. Finally, the third portion, intermediate member, or protrusion 330 extends from the exterior surfaces of the first portion 316 and second portion 326 forming a ring that includes a plurality of holes 332. The protrusion 330 and plurality of holes 332 can receive the base 110 of the cart. Fasteners may be inserted through the plurality of holes 332 to secure the lifting caster systems 104 to the base 110.

As shown in FIGS. 2-21, the feet 258 do not wrap into the centers of the rolling elements 130. By not wrapping into the centers of the rolling elements 130, a broader range of mobility and greater clearance height are provided. In addition, by positioning the swivel foot 222 between the two wheels 154, 166 of each rolling element 130 the lifting caster system 104 can have larger approach angles.

Referring now to FIGS. 30-37, the second end portion, hydraulic mounting base or mounting base 340 is shown. The mounting base 340 includes a cap 342, a set screw 306, a piston 364, and a cylinder body 390. The cap 342 includes a first end 344 and a second end 346 opposite the first end 344. The cap 342 also includes a through hole 348 extending through the cap 342 from the first end 344 to the second end 346. The through hole 348 may have, for example, a first diameter as it extends into the cap 342 at the first end 344 and a second diameter as it extends into the cap 342 at the second end 346. The second diameter of the through hole 348 may be, for example, larger than the first diameter of the through hole 348. The cap 342 may include an interior surface 350 surrounding the through hole 348 and an exterior surface 352. The cap 342 may further include at least one recess 354 extending into the cap 342 from the second end 346 towards the first end 344.

With continued reference to FIGS. 30-37, the set screw or pin 306 is shown. The set screw 306 includes a first end 358 opposite a second end 360. The set screw 306 also includes a drive opening 362 extending into the set screw 306 from the second end 360. The second end 360 of the set screw 306 engages the first end 282 of the lifting shaft 280 to couple the lifting shaft 280 to the piston 364. The piston 364 includes a first end 366 and a second end 368 opposite the first end 366. The piston 364 also includes a head 370 extending from the first end 366 toward the second end 360. The head 370 includes a hole 372 extending into the head 370 from a top surface or the first end 358 of the piston 364. The hole 372 may be, for example, positioned at a center of the head 370. The piston 364 also includes a shaft 374 extending away from the bottom surface of the head 370 to the second end 368 of the piston 364. The shaft 374 includes a first portion 376, a second portion 378, and a coupling end 380. The first portion 376 extends from the bottom surface of the head 370 towards the second end 368. The second portion 378 extends from the bottom surface of the first portion 376 towards the second end 368. The coupling end 380 extends from the bottom surface of the second portion 378 to the second end 368. The first portion 376 has a first diameter that is larger than the second diameter of the second portion 378. In addition, at least a portion of the width or diameter of the coupling end 380 is smaller than the first and second diameters of the first and second portions 376, 378, respectively. The coupling end 380 includes a first mating surface or first flat surface 382 and a second mating surface or second flat surface 384 opposite the first mating surface 382. The portions of the coupling end 380 extending between the mating surfaces 382, 384 may be, for example, arced or curved. The coupling end 380 further includes an opening 386. The opening 386 is sized and shaped, for example, to receive the set screw 306.

The cylinder body 390 is also shown in FIGS. 30-37 and includes a first end 392 and a second end 394 opposite the first end 392. The cylinder body 390 also includes a first portion 394 and a second portion 406. The first portion 394 extends from the first end 392 towards the second end 394. The second portion 406 extends from a bottom surface of the first portion 394 to the second end 394. The first portion 394 also includes a first mating surface or first flat surface 398 and a second mating surface or second flat surface 400, both inset into the exterior surface of the first portion 394. The first mating surface 398 and second mating surface 400 may be, for example, circumferentially spaced from each other and positioned opposite each other. The first portion 294 may further include a first through hole 402 extending through the first portion 394 from the first end 392 towards the second end 394. In addition, the first portion 294 may include a recessed region 404 inset into the top surface of the first portion 294 and positioned circumferentially around the first through hole 402. The second portion 406 may include a tapered edge 408 on the exterior surface of the second end 394. The second portion 406 may also include a second through hole 410 extending through the second portion 406 from the second end 394 toward the first end 392. The second through hole 410 may have, for example, a larger diameter and a larger length than the first through hole 402. Finally, the second portion 406 includes an interior groove 412 inset into the interior surface of the second through hole 410. The interior groove 412 may be, for example, sized and shaped to receive the cap 342, for example, the exterior surface of the cap 342.

As shown in FIGS. 10, 11, 22, and 23, the lifting caster system 104 may be assembled by, for example, obtaining a caster 130 with the wheels 154, 166 and brakes 182, 194 coupled to the base member 132. Next, the spring 270 may be positioned between the top surface of the base member 132 and in the recessed region 252 (FIG. 23) of the extension member 230 of the foot base 222. The fastener 204 may then be inserted into the through hole 134 and through the base member 132 and into the swivel housing 240 (FIG. 22) of the foot base 222 to secure the caster 130 to the foot base 222. Then, the O-ring 302 may be positioned in the first channel 236 and the second end 284 of the lifting shaft 280 is inserted into the swivel housing 240. The foot mount 310 is then slide over the lifting shaft 280 positioning a portion of the lifting shaft 280 within the swivel member 328. Set screws 323 are then inserted into the screw holes 320 and the distal ends engage the key recesses 288, 290 of the lifting shaft 280 to secure the lifting shaft 280 to the foot mount 310. After the foot mount 310 is coupled, the second end 360 of the set screw 306 is inserted into the through hole 294. Next, the cap 342 is positioned on the shaft 374 of the piston 364 and the first end 358 of the set screw 306 is inserted into the opening 386 to couple the lifting shaft 280 to the piston 364. Then, the cylinder body 390 may be positioned over the piston 364 until the cap 342 engages the interior groove 412 of the cylinder body 390. Finally, the lifting caster systems 104 may be coupled to the base 110 of a cart, for example, a robotic cart, by positioning a portion of the base 110 onto the third portion 330 of the foot mount 310 and inserting fasteners through the holes 332 and into the base 110.

With reference to FIGS. 1, 38 and 39, the method of using the cart stabilization system 100 and rolling cart elements may include energizing the lifting caster systems 104 of the cart stabilization system 100 to bring the base to a mobile state, for example, with the lifting caster systems as shown in FIG. 39. The method may also include moving the cart stabilization system 100 to a location for use, for example, an operating room. In addition, the method includes deploying the feet 258 to engage the floor of the use location, for example, with the lifting caster systems as shown in FIG. 38. Further, the method includes relieving the pressure of the energized lifting caster systems 104 to place the lifting caster systems 104 into a passively stable state, for example, with the lifting caster systems as shown in FIG. 38. Next, the robot 102 may be used, for example, to perform a surgical procedure. Finally, once use of the robot 102 is complete, the lifting caster systems 104 may be re-energized and the cart stabilization system 100 may be moved back to storage or to the next location for use.

Further embodiments, the cart stabilization systems may include a pneumatic system operable for energizing and deenergizing the lifting systems. In still further embodiments, the cart stabilization system may include electrical components such as motors, servo motor, rotary actuators or linear actuators, or other operable devices for energizing the lifting systems in a moving state and deenergizing the lifting systems in the passive nonmoving state.

Figure 41:
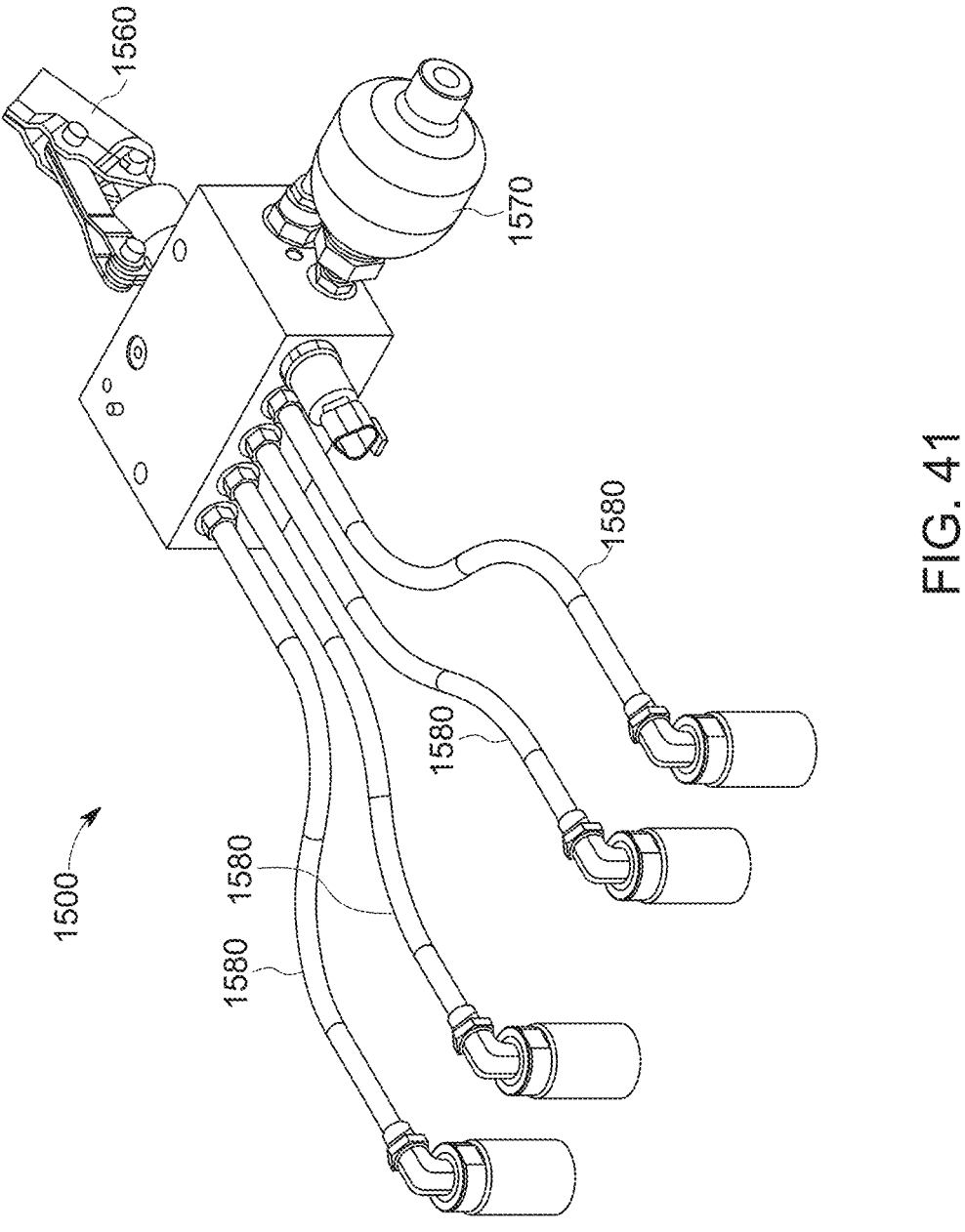
FIG. 41 is a perspective view of an energizable system, in accordance with an aspect of the present disclosure.

FIG. 41 illustrates the components of a hydraulic pump subassembly 1550 having a manifold, manual pump 1560, a reservoir 1570, and a plurality of hydraulic lines or hoses 1580 attachable to hydraulic cylinder, for example as disclosed above, according to an embodiment of the present disclosure. The hydraulic pump subassembly 1550 may further include a flow direction/pressure control valve, a pressure release valve, a flow rate control valve, a pressure sensor. A pump pedal may replace the handle receiver on a manual pump. A pressure release pedal may be mounted to the manifold during integration with the cart.

FIG. 42 illustrates a method 600 for operating a cart stabilization system 100 (FIG. 1) having a plurality of lifting caster systems 104 (FIG. 1). The cart stabilization system may further include a robot 102 (FIG. 1). Method 600 may include at 610 energizing lifting caster systems of the cart stabilization system to bring the base to a mobile state, at 620 moving the cart stabilization system to a use location, ant 630 deploying feet of the lifting caster systems to engage a floor of the use location, relieving the pressure of the energized lifting caster systems and placing the lifting caster systems into a passively stable state.

Figure 40:
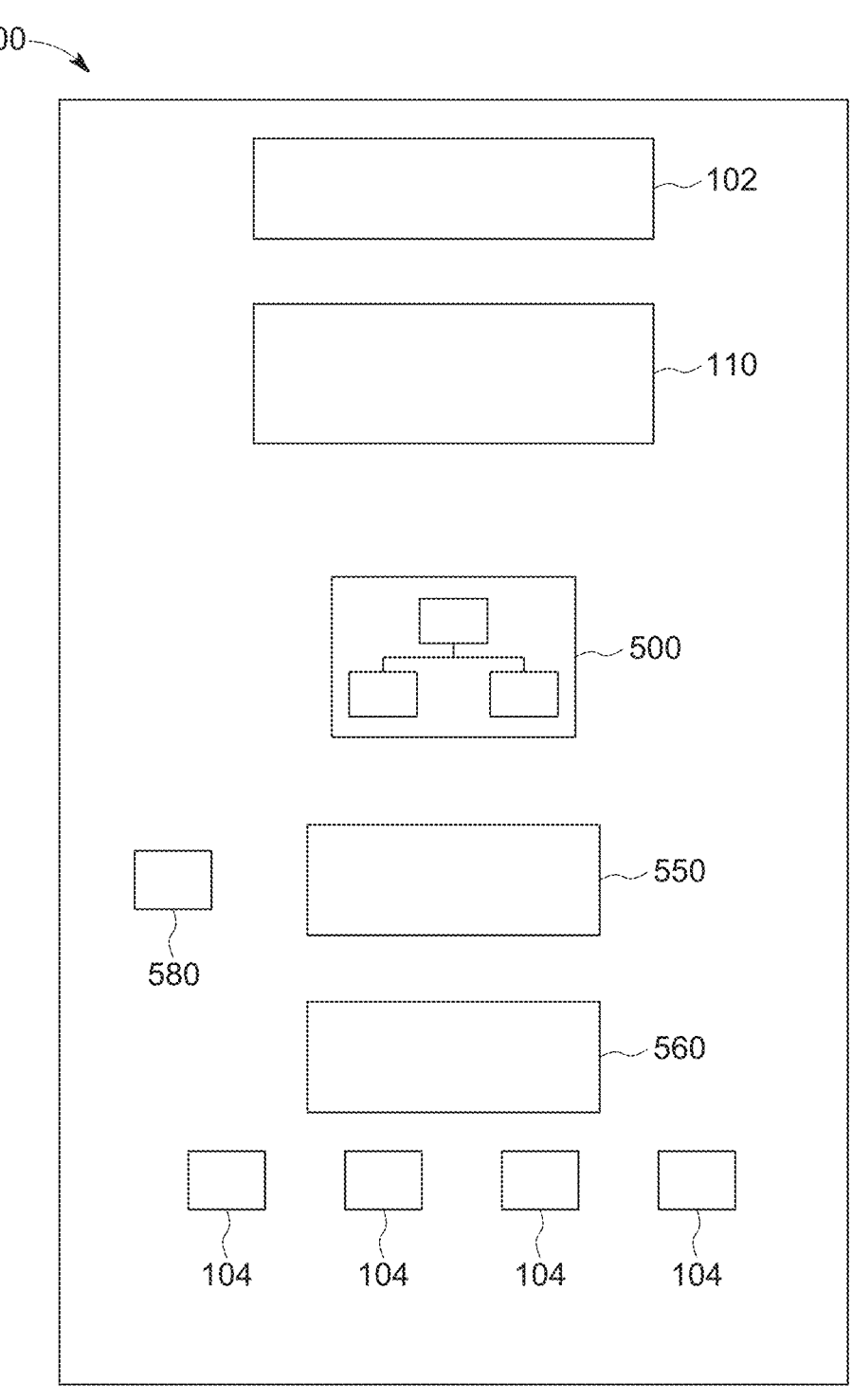
FIG. 40 is a block diagram of the cart stabilization system, in accordance with an aspect of the present disclosure.

It will be understood that the present disclosure include operable control via a controller or control system, e.g., controller 500 (FIG. 40). For example, use of the cart and/or robot may be inhibited or prevented based on pressure data and/or the cart stabilization being in an energized state. Such function and other functions may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts.

These computer program instructions, also referred to as software and/or program code, may also be stored in a computer readable medium that can direct a computer, other programmable data processing apparatus, or other devices to function in a particular manner, such that the instructions stored in the computer readable medium. For example, in a particular arrangement, a desktop or workstation computer may be employed using a commercially available operating system, e.g., Windows®, OSX®, UNIX or Linux based implementation.

The computer readable storage medium may be, for example, but not limited to, an electronic, magnetic, optical, electromagnetic, infrared or semiconductor system, apparatus, or device, or any suitable combination of the foregoing. The storage may include an internal storage device, an attached storage device and/or a network accessible storage device. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program code for carrying out operations for aspects of the present technique may be written in any combination of one or more programming languages, including an object oriented programming language, such as Java, Smalltalk, C++ or the like, and conventional procedural programming languages, such as the "C" programming language, PHP, ASP, assembler or similar programming languages, as well as functional programming languages and languages for technical computing. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Furthermore, more than one computer can be used for implementing the program code, including, but not limited to, one or more resources in a cloud computing environment.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

As may be recognized by those of ordinary skill in the art based on the teachings herein, numerous changes and modifications may be made to the above-described and other embodiments of the present disclosure without departing from the scope of the disclosure. The devices and/or systems as disclosed in the specification, including the accompanying abstract and drawings, may be replaced by alternative component(s) or feature(s), such as those disclosed in another embodiment, which serve the same, equivalent or similar purpose as known by those skilled in the art to achieve the same, equivalent or similar results by such alternative component(s) or feature(s) to provide a similar function for the intended purpose. In addition, the devices and systems may include more or fewer components or features than the embodiments as described and illustrated herein. Accordingly, this detailed description of the currently-preferred embodiments is to be taken in an illustrative, as opposed to limiting of the disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The present disclosure has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the present disclosure be construed as including all such modifications and alterations.

The invention claimed is:

1. A cart stabilization system, comprising:
a base; and
a plurality of lifting caster systems coupled to a bottom portion of the base, wherein each of the plurality of lifting caster system comprises:
a rolling element;
a swivel foot assembly moveably coupled to the rolling element; and
a hydraulic mounting base coupled to a portion of the swivel foot assembly; and
wherein the swivel foot assembly comprises:
a foot base;
a spring received within a portion of the foot base;

a lifting shaft movably coupled to the foot base;
a foot mount coupled to a first end of the lifting shaft; and
an O-ring positioned within a channel in a top surface of the foot base.

2. The cart stabilization system of claim 1, wherein each of the plurality of lifting caster systems have a passive state and a mobile state, and wherein the plurality of lifting caster systems are energized in the mobile state.

3. The cart stabilization system of claim 1, further comprising:
a robot coupled to the base.

4. The cart stabilization system of claim 1, wherein the rolling element comprises:
a base member;
two legs coupled to and extending from the base member;
two wheels, each wheel rotatably coupled to the two legs; and
two brakes, each brake moveably coupled to the base member.

5. The cart stabilization system of claim 4, wherein the rolling element further comprises:
a cover coupled to and extending from the base member, wherein the cover is positioned to extend over at least a portion of the two legs and the two wheels.

6. The cart stabilization system of claim 1, wherein the swivel foot assembly comprises:
a foot base;
a spring received within a portion of the foot base;
a lifting shaft movably coupled to the foot base; and
a foot mount coupled to a first end of the lifting shaft.

7. The cart stabilization system of claim 6, wherein the swivel foot assembly further comprises:
a set screw, wherein a second end of the set screw is received within the lifting shaft.

8. The cart stabilization system of claim 1, wherein the hydraulic mounting base comprises:
a cap;
a piston, wherein the cap is movably coupled to a shaft of the piston; and
a cylinder body, wherein the piston is movably coupled to the cylinder body by the cap coupling to a portion of an interior surface of the cylinder body.

9. The cart stabilization system of claim 8, wherein the hydraulic mounting base further comprises:
a set screw, wherein a first end of the set screw is received within the piston.

10. The cart stabilization system of claim 1, further comprising:
a hydraulic system; and
a manifold block comprising:
hydraulic cavity elements;
a pressure sensor; and
pedals.

11. The cart stabilization system of claim 10, wherein the hydraulic system comprises:
a pump, and
at least one release valve.

12. A cart stabilization system comprising:
a base;
a plurality of lifting systems coupled to a bottom portion of the base, each of the plurality of lifting systems comprising:
a rolling element comprising a base member and a wheel;
a foot;
a spring positioned between and engaging both the base member and the foot wherein the rolling element being movable relative to the foot;

an energizable system including a hydraulic actuator operably connected to the rolling element and to the foot;

wherein energizing the energizable system to reach an energized state causes:

the foot to move in a first direction; and the base member to move in a second direction opposite the first direction; and wherein the energizable system is disposable in:

the energized state with each lifting system of the plurality of lifting systems energized to engage the rolling element with a support structure allowing the cart stabilization system to be movable relative to the support structure; and a deenergized state with each lifting system of the plurality of lifting systems deenergized to engage the foot with the support structure allowing the cart stabilization system to be nonmovable relative to the support structure.

13. The cart stabilization system of claim 12, wherein the energizable system is disposable in:

the energized state with the plurality of lifting systems energized to disengage the foot from a support structure.

14. The cart stabilization system of claim 13, wherein the energizable system is disposable in:

the deenergized state with the plurality of lifting systems deenergized to disengage the rolling elements from the support structure.

15. The cart stabilization system of claim 12, further comprising:

a robot coupled to the base.

16. The cart stabilization system of claim 15, wherein the energizable system comprises:

a hydraulic system including the hydraulic actuator;

a pressure sensor; and a controller operably connected to the hydraulic system and the pressure sensor.

17. The cart stabilization system of claim 16, wherein the controller inhibits operation of the robot when the lifting systems are disposed in the energized state.

18. A method of assembling a lifting caster system, comprising:

obtaining a caster with wheels and brakes coupled to a base member;

positioning a spring between a top surface of the base member and a foot base;

inserting a fastener through a through hole in the base member and into a swivel housing of the foot base;

inserting a second end of a lifting shaft into the swivel housing;

sliding a foot mount over the lifting shaft to position a portion of the lifting shaft within a swivel member in the foot mount;

positioning a cap on a shaft of a piston;

positioning a cylinder body over the piston; and engaging the cap with an interior groove of the cylinder body.

19. The method of assembling the lifting caster system of claim 18, further comprising:

inserting a second end of a set screw into a first end of the lifting shaft; and inserting a first end of the set screw into a second end of the piston.

20. The method of assembling the lifting caster system of claim 18, further comprising:

positioning the spring into a recessed region of an extension member of the foot base.

21. The method of assembling the lifting caster system of claim 18, further comprising:

positioning an O-ring in a first channel of a housing of an extension member of the foot base.

22. The method of assembling the lifting caster system of claim 18, further comprising:

inserting set screws into screw holes in a side of the foot mount; and engaging the set screws with key recesses in the lifting shaft coupling the lifting liftin-shaft to the foot mount.

23. The method of assembling the lifting caster system of claim 18, further comprising:

coupling the assembled lifting caster systems to a bottom of a base of a cart; and coupling a robot to a top of the base of the cart.

24. A lifting caster system comprising:

a rolling element comprising a base member and at least one wheel;

a foot base;

a spring positioned between and engaging both the base member and the foot base;

a hydraulic actuator operably connected to the rolling element and the foot base;

wherein activation of the hydraulic actuator causes:

the foot base to move in a first direction; and the base member to move in a second direction opposite the first direction; and wherein deactivation of the hydraulic actuator causes the spring to compress and close a gap between the foot base and the base member.

25. The lifting caster system of claim 24, wherein the spring comprises a wave spring configured to maintain the gap when the hydraulic actuator is activated and to compress under weight applied to the foot base when the hydraulic actuator is deactivated.

26. The lifting caster system of claim 24, wherein:

when the gap is closed upon deactivation of the hydraulic actuator, the base member directly contacts the foot base; and weight applied to the base member passes through the base member, through the foot base, and to a support surface via the foot base, providing passive stability without requiring energy input to the hydraulic actuator.

27. The lifting caster system of claim 24, wherein:

the at least one wheel comprises two wheels spaced apart from each other;

the foot base comprises a leg member extending from the foot base; and the leg member and the base member are positioned between the two wheels, wherein the positioning of the leg member and base member between the two wheels provides obstacle clearance around a circumference of the two wheels.

28. The lifting caster system of claim 24, wherein the hydraulic actuator comprises:

a piston having a shaft;

a cap movably coupled to the shaft of the piston;

a cylinder body having an interior groove; and wherein the piston is movably coupled to the cylinder body by the cap engaging the interior groove, wherein movement of the piston within the cylinder body causes corresponding movement of the foot base relative to the base member.

\* \* \* \* \*